US010986661B2

(12) United States Patent
Basu Mallick et al.

(10) Patent No.: US 10,986,661 B2
(45) Date of Patent: Apr. 20, 2021

(54) TRANSMITTING A PHYSICAL DOWNLINK SHARED CHANNEL AFTER LOSING UPLINK SYNCHRONIZATION

(71) Applicant: Lenovo (Singapore) PTE. LTD., New Tech Park (SG)

(72) Inventors: Prateek Basu Mallick, Langen (DE); Alexander Johann Maria Golitschek Edler von Elbwart, Darmstadt (DE); Joachim Loehr, Wiesbaden (DE); Hyejung Jung, Palatine, IL (US); Ravi Kuchibhotla, Clarendon Hills, IL (US); Vijay Nangia, Woodridge, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/143,964

(22) Filed: Sep. 27, 2018

(65) Prior Publication Data

US 2020/0107347 A1 Apr. 2, 2020

(51) Int. Cl.
*H04W 72/12* (2009.01)
*H04L 1/18* (2006.01)
(Continued)

(52) U.S. Cl.
CPC ....... *H04W 72/1289* (2013.01); *H04L 1/1812* (2013.01); *H04L 5/0055* (2013.01);
(Continued)

(58) Field of Classification Search
CPC ........... H04W 72/042; H04W 72/0446; H04W 72/1289; H04W 72/14; H04W 72/04;
(Continued)

(56) References Cited

U.S. PATENT DOCUMENTS 9,173,231 B2 * 10/2015 Kim ...................... H04L 5/001
9,184,826 B2 11/2015 Lee et al.
(Continued)

FOREIGN PATENT DOCUMENTS

| EP | 2953415 A1 | 12/2015 | |
|---|---|---|---|
| WO | 2013067693 A1 | 5/2013 | |
| WO | WO-2018169937 A1 * | 9/2018 | ........... H04L 5/0055 |

OTHER PUBLICATIONS

3GPP "3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.0.0, Dec. 2007, pp. 1-23.
(Continued)

*Primary Examiner* — Chi H Pham
*Assistant Examiner* — Ji-Hae Yea
(74) *Attorney, Agent, or Firm* — Kunzler Bean & Adamson

(57) ABSTRACT

Apparatuses, methods, and systems are disclosed for transmitting a physical downlink shared channel after losing uplink synchronization. One method includes: transmitting first downlink control information that schedules a physical downlink control channel order; transmitting second downlink control information that schedules a physical downlink shared channel transmission; transmitting the physical downlink control channel order based on the first downlink control information; transmitting the physical downlink shared channel transmission based on the second downlink control information, wherein the physical downlink control channel order and at least a portion of the physical downlink shared channel transmission are transmitted after a remote unit loses an uplink synchronization and before the remote unit completes a physical random access channel procedure.

20 Claims, 15 Drawing Sheets

(51) Int. Cl.
  *H04L 5/00* (2006.01)
  *H04W 72/04* (2009.01)
  *H04W 74/08* (2009.01)
  *H04W 88/08* (2009.01)

(52) U.S. Cl.
  CPC ..... *H04W 72/042* (2013.01); *H04W 74/0833* (2013.01); *H04W 88/085* (2013.01)

(58) Field of Classification Search
  CPC ......... H04W 72/1273; H04W 72/0406; H04W 24/10; H04W 72/12; H04W 72/1263; H04W 76/27; H04W 76/28; H04W 52/54; H04W 72/044; H04W 74/0833; H04W 28/06; H04W 72/1205; H04W 72/1252; H04W 72/1278; H04W 16/02; H04W 36/0088; H04W 52/0216; H04W 52/14; H04W 56/001; H04W 72/02; H04W 72/10; H04W 72/1242; H04W 74/02; H04W 80/02; H04L 5/0053; H04L 5/0094; H04L 5/0055; H04L 5/0048; H04L 1/1854; H04L 5/0092; H04L 1/1861; H04L 1/0046; H04L 1/1816; H04L 1/1887; H04L 27/2602; H04L 5/0073; H04L 1/1893; H04L 1/0001; H04L 1/0083; H04L 1/1829; H04L 25/0268; H04L 25/03955; H04L 1/001; H04L 1/0028; H04L 1/0075; H04L 1/0079; H04L 1/008; H04L 1/1671; H04L 41/08; H04L 5/0035; H04B 7/0626; H04B 7/0456; H04B 1/7087; H04B 7/0417; H04B 7/0639; H04B 7/08; H04J 11/0079; H04J 11/0036; H04J 11/0073; H04J 13/00; H03M 13/095; H03M 13/353
  See application file for complete search history.

(56) References Cited

U.S. PATENT DOCUMENTS

| | | | |
|---|---|---|---|
| 2012/0106477 A1 | 5/2012 | Kwon et al. | |
| 2012/0320805 A1* | 12/2012 | Yang | H04L 1/18 370/280 |
| 2013/0079013 A1 | 3/2013 | Shi | |
| 2013/0195045 A1* | 8/2013 | Papasakellariou | H04W 72/042 370/329 |
| 2013/0223366 A1* | 8/2013 | Papasakellariou | H04L 5/0007 370/329 |
| 2015/0009936 A1* | 1/2015 | Quan | H04W 74/008 370/329 |
| 2015/0018036 A1 | 1/2015 | Faronius et al. | |
| 2015/0296509 A1 | 10/2015 | Yang et al. | |
| 2016/0037492 A1* | 2/2016 | Xu | H04L 5/14 370/280 |
| 2016/0198453 A1 | 7/2016 | Hu et al. | |
| 2016/0262182 A1 | 9/2016 | Yang et al. | |
| 2016/0338028 A1 | 11/2016 | Park | |
| 2017/0331577 A1 | 11/2017 | Parkvall et al. | |
| 2017/0353819 A1 | 12/2017 | Yin et al. | |
| 2018/0041997 A1 | 2/2018 | Babaei et al. | |
| 2018/0042043 A1 | 2/2018 | Babaei et al. | |
| 2018/0115430 A1 | 4/2018 | Seo | |
| 2018/0124753 A1* | 5/2018 | Sun | H04W 72/042 |
| 2018/0199334 A1 | 7/2018 | Ying et al. | |
| 2018/0317263 A1 | 11/2018 | Ishii | |
| 2018/0331746 A1 | 11/2018 | Okuyama et al. | |
| 2018/0367285 A1 | 12/2018 | Yi et al. | |
| 2018/0368107 A1 | 12/2018 | Babaei et al. | |
| 2019/0190661 A1 | 6/2019 | You et al. | |
| 2019/0349837 A1 | 11/2019 | Shih et al. | |
| 2020/0037367 A1 | 1/2020 | Kim et al. | |
| 2020/0107358 A1 | 4/2020 | Basu Mallick et al. | |
| 2020/0128588 A1 | 4/2020 | Xiong et al. | |

OTHER PUBLICATIONS

3GPP "3rd Generation Partnership Project; Technical Specification Group Radio Access Network; NR; Multiplexing and channel coding (Release 15)", 3GPP TS 38.212 V15.2.0, Jun. 2018, pp. 1-105.

3GPP "3rd Generation Partnership Project; Technical Specification Group Radio Access Network; NR; Physical layer procedures for control (Release 15)", 3GPP TS 38.213 V15.2.0, Jun. 2018, pp. 1-99.

3GPP, "3rd Generation Partnership Project; Technical Specification Group Radio Access Network; NR; Physical layer procedures for data (Release 15)", 3GPP TS 38.214 V15.1.0, Mar. 2018, pp. 1-77.

PCT/IB2018/001198, "Invitation to Pay Additional Fees and, Where Applicable, Protest Fee", International Searching Authority, dated Jun. 24, 2019, pp. 1-19.

PCT/IB2018/001198, "Notification of Transmittal of the International Search Report and the Written Opinion of the International Searching Authority, or the Declaration", International Searching Authority, Jun. 6, 2019, pp. 1-14.

Catt, "Further details on NR 4-step RA Procedure", 3GPP TSG RAN WG1 Meeting #90bis R1-1717803, Oct. 9-13, 2017, pp. 1-20.

Ericsson, "Remaining Details in UL Transmission Procedures", 3GPP TSG RAN WG1 Meeting #92 R1-1802913, Feb. 26-Mar. 2, 2018, pp. 1-8.

U.S. Appl. No. 16/144,150 "Office Action Summary", dated Feb. 31, 2020, pp. 1-41.

PCT/IB2018/001198, "Notification of Transmittal of the International Search Report and the Written Opinion of the International Searching Authority, or the Declaration", International Searching Authority, dated Nov. 7, 2019, pp. 1-29.

Ericsson, "Semi-persistent scheduling for NB-IoT", 3GPP TSG RAN WG1 Meeting #93 R1-1805859, May 21-25, 2018, pp. 1-8.

U.S. Appl. No. 16/144,150, "Office Action Summary", USPTO, dated Jun. 18, 2020, pp. 1-35.

U.S. Appl. No. 16/144,150, "Office Action Summary", USPTO, dated Aug. 21, 2020, pp. 1-37.

U.S. Appl. No. 16/144,150, "Office Action Summary", USPTO, dated Dec. 31, 2020, pp. 1-35.

* cited by examiner

TRANSMITTING A PHYSICAL DOWNLINK SHARED CHANNEL AFTER LOSING UPLINK SYNCHRONIZATION

FIELD

The subject matter disclosed herein relates generally to wireless communications and more particularly relates to transmitting a physical downlink shared channel after losing uplink synchronization.

BACKGROUND

The following abbreviations are herewith defined, at least some of which are referred to within the following description: Third Generation Partnership Project ("3GPP"), 5$^{th}$ Generation ("5G"), Positive-Acknowledgment ("ACK"), Access Point ("AP"), Autonomous Uplink ("AUL"), Binary Phase Shift Keying ("BPSK"), Buffer Status Report ("BSR"), Cell-RNTI ("C-RNTI"), Carrier Aggregation ("CA"), Clear Channel Assessment ("CCA"), Common Control Channel ("CCCH"), Cyclic Delay Diversity ("CDD"), Code Division Multiple Access ("CDMA"), Control Element ("CE"), Closed-Loop ("CL"), Coordinated Multipoint ("CoMP"), Cyclic Prefix ("CP"), Cyclical Redundancy Check ("CRC"), Channel State Information ("CSI"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Volume and Power Headroom Report ("DPR"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Services ("GPRS"), Guard Period ("GP"), Global System for Mobile Communications ("GSM"), Hybrid Automatic Repeat Request ("HARQ"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Identity ("LCD"), Logical Channel Prioritization ("LCP"), Long Term Evolution ("LTE"), Multiple Access ("MA"), Medium Access Control ("MAC"), Multimedia Broadcast Multicast Services ("MBMS"), Modulation Coding Scheme ("MCS"), Machine Type Communication ("MTC"), massive MTC ("mMTC"), Multiple Input Multiple Output ("MIMO"), Maximum Power Reduction ("MPR"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), New Radio ("NR"), Orthogonal Frequency Division Multiplexing ("OFDM"), Open-Loop ("OL"), Power Angular Spectrum ("PAS"), Power Control ("PC"), Primary Cell ("PCell"), Primary Secondary Cell ("PSCell"), Physical Broadcast Channel ("PBCH"), Physical Downlink Control Channel ("PDCCH"), Packet Data Convergence Protocol ("PDCP"), Physical Downlink Shared Channel ("PDSCH"), Pattern Division Multiple Access ("PDMA"), Physical Hybrid ARQ Indicator Channel ("PHICH"), Power Headroom ("PH"), Power Headroom Report ("PHR"), Physical Layer ("PHY"), Physical Random Access Channel ("PRACH"), Physical Resource Block ("PRB"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Radio Access Network ("RAN"), Radio Access Technology ("RAT"), Resource Block Assignment ("RBA"), Radio Resource Control ("RRC"), Random Access Procedure ("RACH"), Random Access Response ("RAR"), Radio Link Control ("RLC"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), Signal-to-Interference-Plus-Noise Ratio ("SINR"), System Information Block ("SIB"), Scheduling Request ("SR"), Synchronization Signal ("SS"), Scheduled Uplink ("SUL"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX").

In certain wireless communications networks, a physical downlink shared channel transmission may be made. In such networks, a timing of this transmission may depend on a remote unit status.

BRIEF SUMMARY

Methods for transmitting a physical downlink shared channel after losing uplink synchronization are disclosed. Apparatuses and systems also perform the functions of the apparatus. One embodiment of a method includes transmitting first downlink control information that schedules a physical downlink control channel order. In some embodiments, the method includes transmitting second downlink control information that schedules a physical downlink shared channel transmission. In certain embodiments, the method includes transmitting the physical downlink control channel order based on the first downlink control information. In various embodiments, the method includes transmitting the physical downlink shared channel transmission based on the second downlink control information. In such embodiments, the physical downlink control channel order and at least a portion of the physical downlink shared channel transmission are transmitted after a remote unit loses an uplink synchronization and before the remote unit completes a physical random access channel procedure.

One apparatus for transmitting a physical downlink shared channel after losing uplink synchronization includes a transmitter that: transmits first downlink control information that schedules a physical downlink control channel order; transmits second downlink control information that schedules a physical downlink shared channel transmission; transmits the physical downlink control channel order based on the first downlink control information; and transmits the physical downlink shared channel transmission based on the second downlink control information. In such embodiments, the physical downlink control channel order and at least a portion of the physical downlink shared channel transmission are transmitted after a remote unit loses an uplink synchronization and before the remote unit completes a physical random access channel procedure.

One method for receiving a physical downlink shared channel after losing uplink synchronization includes receiving first downlink control information that schedules a physical downlink control channel order. In some embodiments, the method includes receiving second downlink control information that schedules a physical downlink shared channel transmission. In certain embodiments, the method includes receiving the physical downlink control channel order based on the first downlink control information. In various embodiments, the method includes receiving the physical downlink shared channel transmission based on the second downlink control information. In such embodiments, the physical downlink control channel order and at least a portion of the physical downlink shared channel transmission are received after a remote unit loses an uplink synchronization and before the remote unit completes a physical random access channel procedure.

One apparatus for receiving a physical downlink shared channel after losing uplink synchronization includes a receiver that: receives first downlink control information that schedules a physical downlink control channel order; receives second downlink control information that schedules a physical downlink shared channel transmission; receives the physical downlink control channel order based on the first downlink control information; and receives the physical downlink shared channel transmission based on the second downlink control information. In such embodiments, the physical downlink control channel order and at least a portion of the physical downlink shared channel transmission are received after a remote unit loses an uplink synchronization and before the remote unit completes a physical random access channel procedure.

One method for transmitting a physical downlink shared channel after losing uplink synchronization includes transmitting a physical downlink control channel order. In some embodiments, the method includes transmitting a physical downlink shared channel transmission. In such embodiments, the physical downlink control channel order and at least a portion of the physical downlink shared channel transmission are transmitted after a remote unit loses an uplink synchronization and before the remote unit completes a physical random access channel procedure. In certain embodiments, the method includes receiving feedback information corresponding to the physical downlink shared channel transmission.

One apparatus for transmitting a physical downlink shared channel after losing uplink synchronization includes a transmitter that: transmits a physical downlink control channel order; and transmits a physical downlink shared channel transmission. In such embodiments, the physical downlink control channel order and at least a portion of the physical downlink shared channel transmission are transmitted after a remote unit loses an uplink synchronization and before the remote unit completes a physical random access channel procedure. In various embodiments, the apparatus includes a receiver that receives feedback information corresponding to the physical downlink shared channel transmission.

One method for receiving a physical downlink shared channel after losing uplink synchronization includes receiving a physical downlink control channel order. In some embodiments, the method includes receiving a physical downlink shared channel transmission. In such embodiments, the physical downlink control channel order and at least a portion of the physical downlink shared channel transmission are received after a remote unit loses an uplink synchronization and before the remote unit completes a physical random access channel procedure. In certain embodiments, the method includes transmitting feedback information corresponding to the physical downlink shared channel transmission.

One apparatus for receiving a physical downlink shared channel after losing uplink synchronization includes a receiver that: receives a physical downlink control channel order; and receives a physical downlink shared channel transmission. In such embodiments, the physical downlink control channel order and at least a portion of the physical downlink shared channel transmission are received after a remote unit loses an uplink synchronization and before the remote unit completes a physical random access channel procedure. In some embodiments, the apparatus includes a transmitter that transmits feedback information corresponding to the physical downlink shared channel transmission.

One method for transmitting downlink data after losing uplink synchronization includes determining a remote unit that is to receive downlink data. In some embodiments, the method includes transmitting the downlink data with a random access response. In such embodiments, the downlink data is transmitted after the remote unit loses an uplink synchronization and before the remote unit completes a physical random access channel procedure. In certain embodiments, the method includes receiving feedback information corresponding to the downlink data.

One apparatus for transmitting downlink data after losing uplink synchronization includes a processor that determines a remote unit that is to receive downlink data. In various embodiments, the apparatus includes a transmitter that transmits the downlink data with a random access response. In such embodiments, the downlink data is transmitted after the remote unit loses an uplink synchronization and before the remote unit completes a physical random access channel procedure. In certain embodiments, the apparatus includes a receiver that receives feedback information corresponding to the downlink data.

One method for receiving downlink data after losing uplink synchronization includes receiving downlink data with a random access response. In such embodiments, the downlink data is received after a remote unit loses an uplink synchronization and before the remote unit completes a physical random access channel procedure. In some embodiments, the method includes transmitting feedback information corresponding to the downlink data.

One apparatus for receiving downlink data after losing uplink synchronization includes a receiver that receives downlink data with a random access response. In such embodiments, the downlink data is received after a remote unit loses an uplink synchronization and before the remote unit completes a physical random access channel procedure. In various embodiments, the apparatus includes a transmitter that transmits feedback information corresponding to the downlink data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
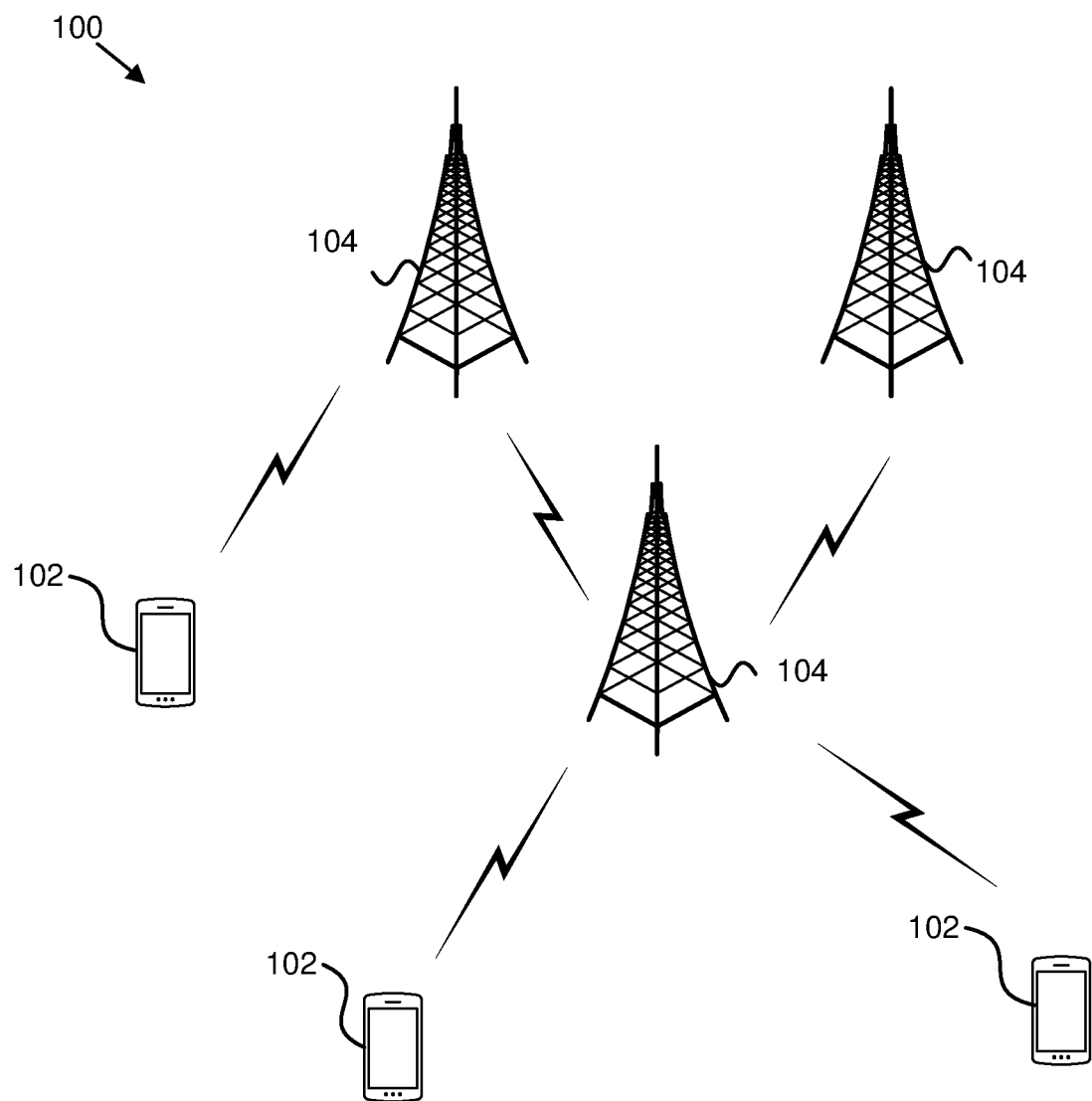
FIG. 1 is a schematic block diagram illustrating one embodiment of a wireless communication system for transmitting and/or receiving a physical downlink shared channel after losing uplink synchronization.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving a physical downlink shared channel after losing uplink synchronization. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a network unit 104 may be used for transmitting a physical downlink shared channel after losing uplink synchronization. In various embodiments, the network unit 104 may transmit first downlink control information that schedules a physical downlink control channel order. In some embodiments, the network unit 104 may transmit second downlink control information that schedules a physical downlink shared channel transmission. In certain embodiments, the network unit 104 may transmit the physical downlink control channel order based on the first downlink control information. In various embodiments, the network unit 104 may transmit the physical downlink shared channel transmission based on the second downlink control information. In such embodiments, the physical downlink control channel order and at least a portion of the physical downlink shared channel transmission are transmitted after a remote unit 102 loses an uplink synchronization and before the remote unit 102 completes a physical random access channel procedure. Accordingly, the network unit 104 may be used for transmitting a physical downlink shared channel after losing uplink synchronization.

In one embodiment, a remote unit 102 may be used for receiving a physical downlink shared channel after losing uplink synchronization. In certain embodiments, the remote unit 102 may receive first downlink control information that schedules a physical downlink control channel order. In some embodiments, the remote unit 102 may receive second downlink control information that schedules a physical downlink shared channel transmission. In certain embodiments, the remote unit 102 may receive the physical downlink control channel order based on the first downlink control information. In various embodiments, the remote unit 102 may receive the physical downlink shared channel transmission based on the second downlink control information. In such embodiments, the physical downlink control channel order and at least a portion of the physical downlink shared channel transmission are received after the remote unit 102 loses an uplink synchronization and before the remote unit 102 completes a physical random access channel procedure. Accordingly, the remote unit 102 may be used for receiving a physical downlink shared channel after losing uplink synchronization.

In certain embodiments, a network unit 104 may be used for transmitting a physical downlink shared channel after losing uplink synchronization. In various embodiments, the network unit 104 may transmit a physical downlink control channel order. In some embodiments, the network unit 104 may transmit a physical downlink shared channel transmission. In such embodiments, the physical downlink control channel order and at least a portion of the physical downlink shared channel transmission are transmitted after a remote unit 102 loses an uplink synchronization and before the remote unit 102 completes a physical random access channel procedure. In certain embodiments, the network unit 104 may receive feedback information corresponding to the physical downlink shared channel transmission. Accordingly, the network unit 104 may be used for transmitting a physical downlink shared channel after losing uplink synchronization.

In one embodiment, a remote unit 102 may be used for receiving a physical downlink shared channel after losing uplink synchronization. In certain embodiments, the remote unit 102 may receive a physical downlink control channel order. In some embodiments, the remote unit 102 may receive a physical downlink shared channel transmission. In such embodiments, the physical downlink control channel order and at least a portion of the physical downlink shared channel transmission are received after the remote unit 102 loses an uplink synchronization and before the remote unit 102 completes a physical random access channel procedure. In certain embodiments, the remote unit 102 may transmit feedback information corresponding to the physical downlink shared channel transmission. Accordingly, the remote unit 102 may be used for receiving a physical downlink shared channel after losing uplink synchronization.

In certain embodiments, a network unit 104 may be used for transmitting downlink data after losing uplink synchronization. In various embodiments, the network unit 104 may determine a remote unit 102 that is to receive downlink data. In some embodiments, the network unit 104 may transmit the downlink data with a random access response. In such embodiments, the downlink data is transmitted after the remote unit 102 loses an uplink synchronization and before the remote unit 102 completes a physical random access channel procedure. In certain embodiments, the network unit 104 may receive feedback information corresponding to the downlink data. Accordingly, the network unit 104 may be used for transmitting downlink data after losing uplink synchronization.

In one embodiment, a remote unit 102 may be used for receiving downlink data after losing uplink synchronization. In certain embodiments, the remote unit 102 may receive downlink data with a random access response. In such embodiments, the downlink data is received after the remote unit 102 loses an uplink synchronization and before the remote unit 102 completes a physical random access channel procedure. In some embodiments, the remote unit 102 may transmit feedback information corresponding to the downlink data. Accordingly, the remote unit 102 may be used for receiving downlink data after losing uplink synchronization.

Figure 2:
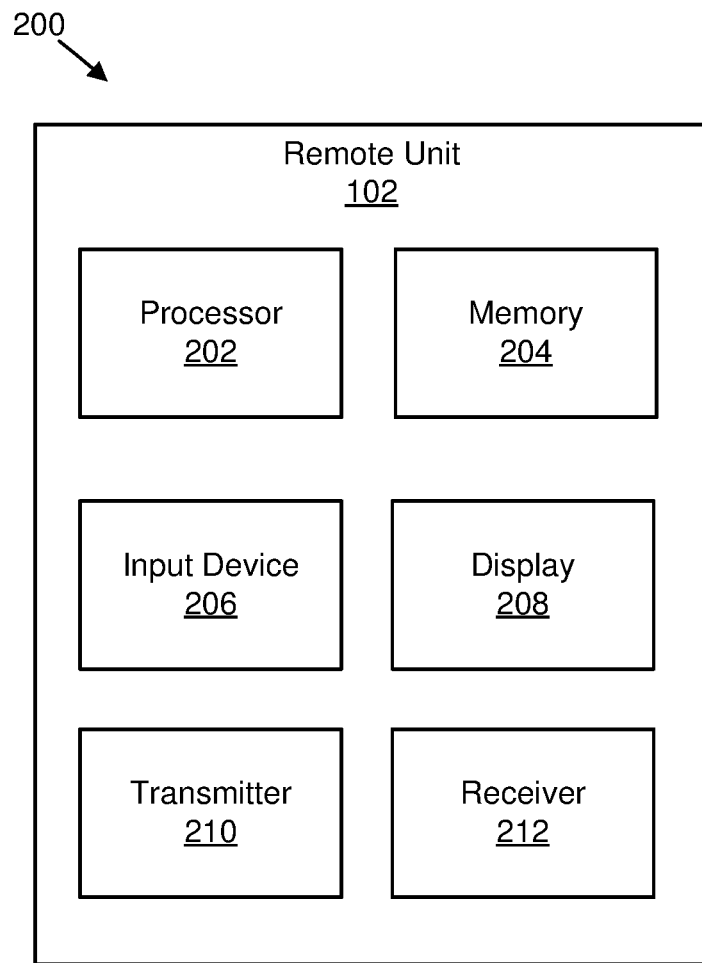
FIG. 2 is a schematic block diagram illustrating one embodiment of an apparatus that may be used for receiving a physical downlink shared channel after losing uplink synchronization.

FIG. 2 depicts one embodiment of an apparatus 200 that may be used for receiving a physical downlink shared channel after losing uplink synchronization. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD") display, a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212: receives first downlink control information that schedules a physical downlink control channel order; receives second downlink control information that schedules a physical downlink shared channel transmission; receives the physical downlink control channel order based on the first downlink control information; and receives the physical downlink shared channel transmission based on the second downlink control information. In such embodiments, the physical downlink control channel order and at least a portion of the physical downlink shared channel transmission are received after a remote unit 102 loses an uplink synchronization and before the remote unit 102 completes a physical random access channel procedure.

In various embodiments, the receiver 212: receives a physical downlink control channel order; and receives a physical downlink shared channel transmission. In such embodiments, the physical downlink control channel order and at least a portion of the physical downlink shared channel transmission are received after a remote unit 102 loses an uplink synchronization and before the remote unit 102 completes a physical random access channel procedure. In some embodiments, the transmitter 210 transmits feedback information corresponding to the physical downlink shared channel transmission.

In certain embodiments, the receiver 212 receives downlink data with a random access response. In such embodiments, the downlink data is received after a remote unit 102 loses an uplink synchronization and before the remote unit 102 completes a physical random access channel procedure. In various embodiments, the transmitter 210 transmits feedback information corresponding to the downlink data. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
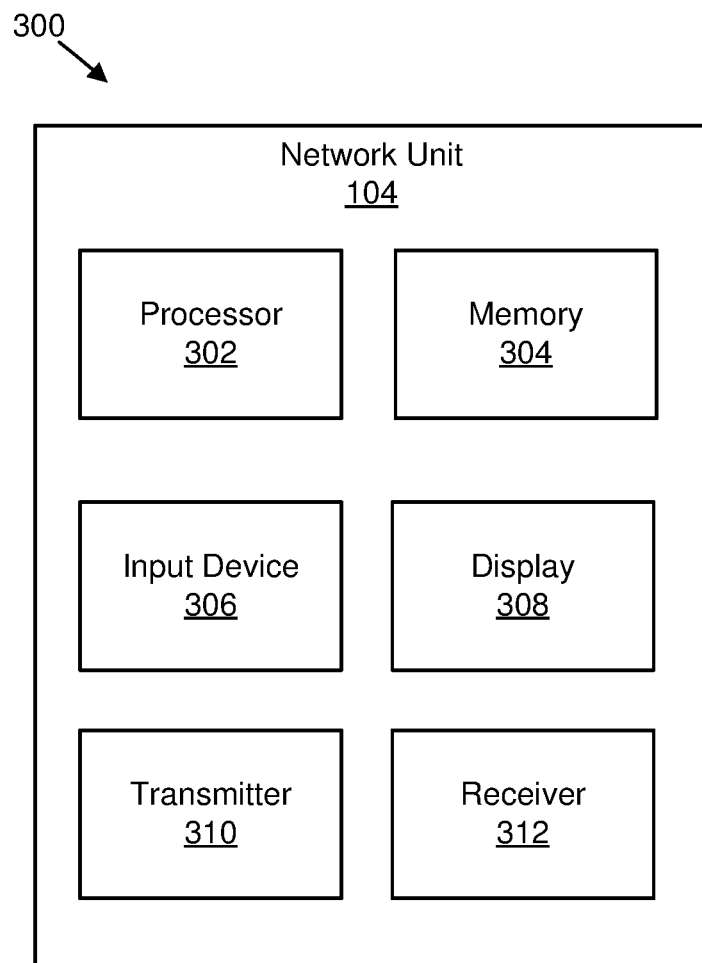
FIG. 3 is a schematic block diagram illustrating one embodiment of an apparatus that may be used for transmitting a physical downlink shared channel after losing uplink synchronization.

FIG. 3 depicts one embodiment of an apparatus 300 that may be used for transmitting a physical downlink shared channel after losing uplink synchronization. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310: transmits first downlink control information that schedules a physical downlink control channel order; transmits second downlink control information that schedules a physical downlink shared channel transmission; transmits the physical downlink control channel order based on the first downlink control information; and transmits the physical downlink shared channel transmission based on the second downlink control information. In such embodiments, the physical downlink control channel order and at least a portion of the physical downlink shared channel transmission are transmitted after a remote unit 102 loses an uplink synchronization and before the remote unit 102 completes a physical random access channel procedure.

In various embodiments, the transmitter 310: transmits a physical downlink control channel order; and transmits a physical downlink shared channel transmission. In such embodiments, the physical downlink control channel order and at least a portion of the physical downlink shared channel transmission are transmitted after a remote unit 102 loses an uplink synchronization and before the remote unit 102 completes a physical random access channel procedure. In various embodiments, the receiver 312 receives feedback information corresponding to the physical downlink shared channel transmission.

In certain embodiments, the processor 302 determines a remote unit 102 that is to receive downlink data. In various embodiments, the transmitter 310 transmits the downlink data with a random access response. In such embodiments, the downlink data is transmitted after the remote unit loses an uplink synchronization and before the remote unit 102 completes a physical random access channel procedure. In certain embodiments, the receiver 312 receives feedback information corresponding to the downlink data. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
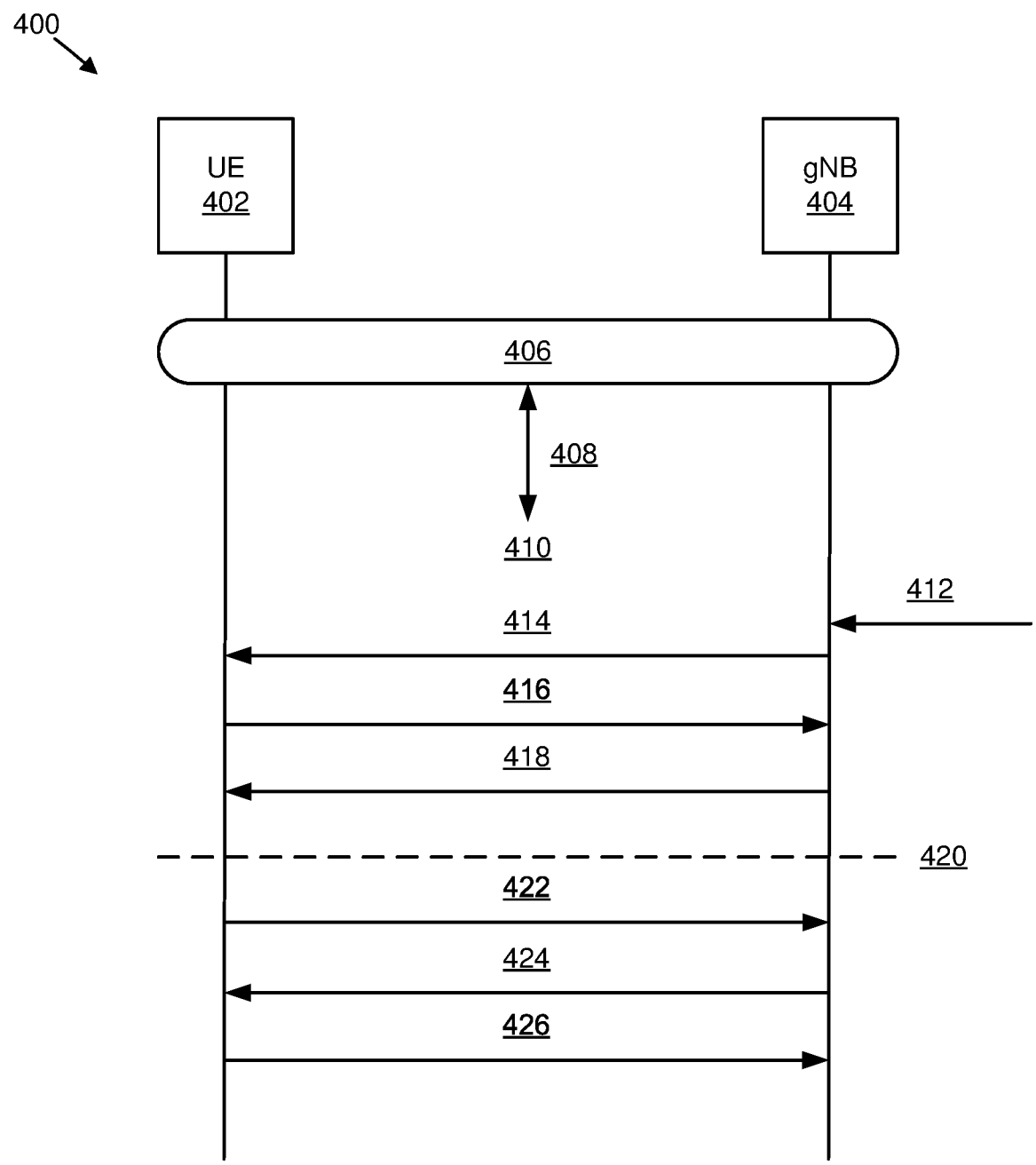
FIG. 4 is a schematic block diagram illustrating one embodiment of communications between a UE and a gNB.

In certain embodiments, PDCCH order is a mechanism by which a gNB (or any RAN node like an eNB in LTE) orders a UE (e.g., remote unit 102) to initiate PRACH. In some embodiments, a PDCCH order is sent in response to a network unit 104 having DL data for the UE, but suspects that the UE is not UL Synchronized (e.g., because the TAT has expired). In various embodiments, by ordering the UE to perform a RACH procedure, the gNB may enable the UE to apply a timing advance before the UE is ready to send anything (e.g., HARQ feedback for any DL data) in the UL. As shown in FIG. 4, it may take at least five message exchanges between the UE and the network unit 104 (e.g., gNB) to start sending first downlink data. This may take more message exchanges in an unlicensed spectrum due to restrictions imposed by an LBT procedure. Accordingly, as may be appreciated, this large number of message exchanges may make DL transmission resumption inefficient resulting in wasted time and/or excessive UE battery consumption. Accordingly, even for a licensed spectrum, latency sensitive applications may operate inefficiently. In some embodiments, a network unit 104 may have only one DL packet (e.g., application layer signalling) to send and such an elaborate procedure to resume data transmission may be inefficient. As described herein, various communication sequences may be used to reduce such inefficiencies while a UE is out of UL synchronization.

FIG. 4 is a schematic block diagram illustrating one embodiment of communications 400 between a UE 402 (e.g., remote unit 102) and a gNB 404 (e.g., network unit 104). The communications 400 illustrate that the UE 402 starts in an RRC connected state 406. After TAT expiration 408, the UE 402 loses an UL synchronization 410. At a time after the UE 402 loses the UL synchronization 410, DL data arrives 412 at the gNB 404. In response to the DL data arriving 412 at the gNB 404, the gNB 404 transmits 414 a PDCCH order to the UE 402. Accordingly, the UE 402 initiates a PRACH procedure by transmitting 416 a PRACH message 1 (e.g., PRACH preamble) to the gNB 404. In response to receiving the PRACH message 1, the gNB 404 transmits 418 a random access response (e.g., message 2) to the UE 402. At a time 420 after the gNB 404 transmits 418 the random access response, the UE 402 has UL synchronization. Accordingly, the UE 402 transmits a PUSCH 422 to the gNB 404. As a result of receiving the PUSCH 422, the gNB 404 transmits one or more DL TBs 424 based on the DL data that arrived 412 at the gNB 404. In response to receiving the one or more DL TBs 424, the UE 402 transmits feedback 426 (e.g., HARQ-ACK, ACK/NACK) to the gNB 404 to indicate whether the one or more DL TBs 424 were received correctly.

As illustrated in FIG. 4, in certain embodiments in the licensed medium (e.g., like 5G NR licensed bands), the system 100 (e.g., UE 402 and the gNB 404 together) may perform 4-5 message exchange to accomplish a first downlink data transmission at times in which the UE 402 is not UL synchronized. Moreover, transmissions on an unlicensed medium, including transmission by the UE 402 and the network (e.g., gNB 404), may need to follow an LBT procedure for each of those messages individually and independently. As may be appreciated, the above inefficiency applies to a random access procedure as well as to downlink (e.g., PDSCH) and uplink (e.g., PUSCH) transmissions. Each of these transmissions must first undergo a CCA procedure before the transmission can be made on the unlicensed spectrum. Thus, in certain configurations, many message exchanges may be required for a first DL data packet at times in which the UE 402 is out of synchronisation, irrespective of being in the licensed or the unlicensed band.

Figure 5:
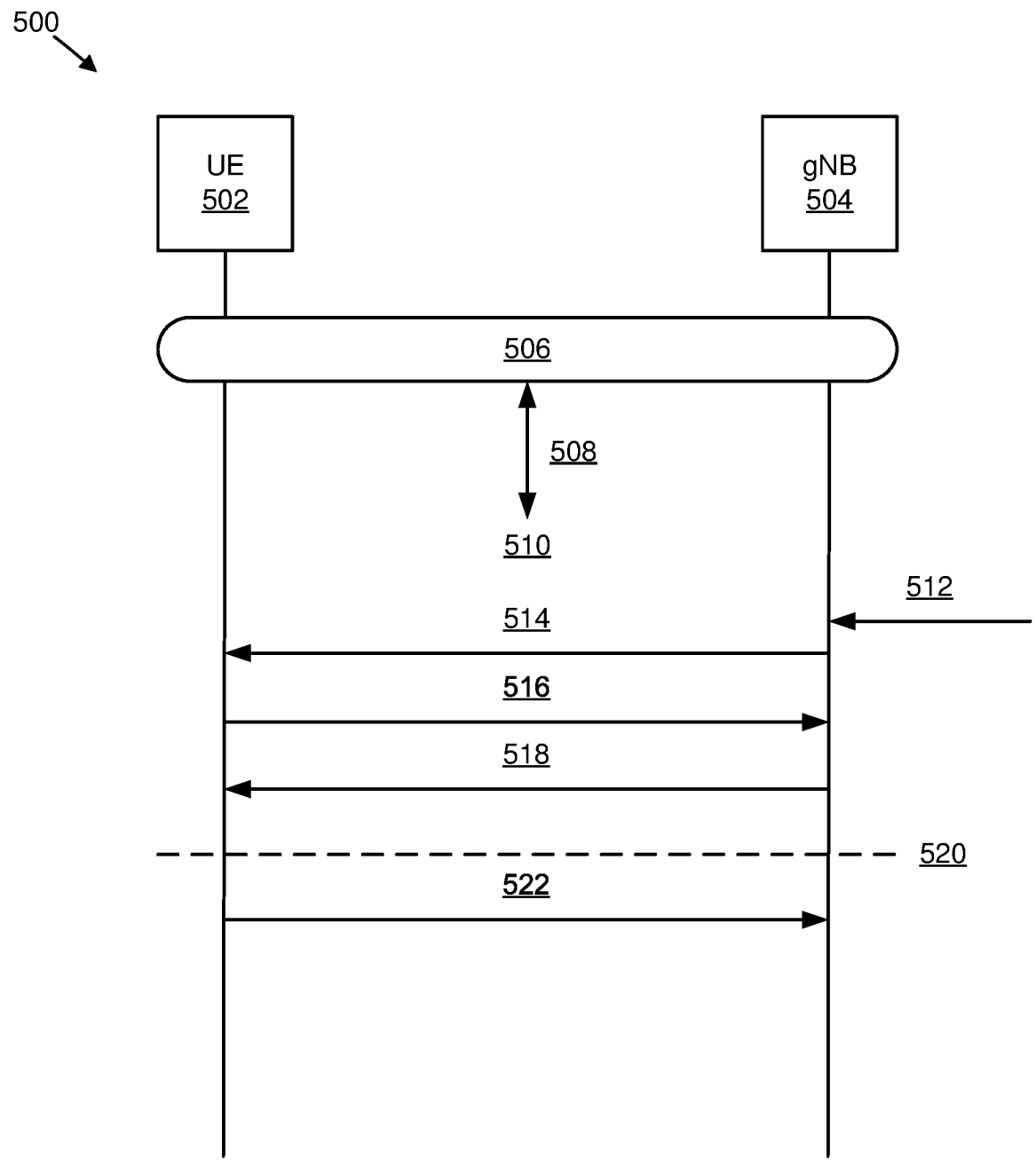
FIG. 5 is a schematic block diagram illustrating another embodiment of communications between a UE and a gNB.

FIG. 5 is a schematic block diagram illustrating another embodiment of communications 500 between a UE 502 (e.g., remote unit 102) and a gNB 504 (e.g., network unit 104). The communications 500 illustrate that the UE 502 starts in an RRC connected state 506. After TAT expiration 508, the UE 502 loses an UL synchronization 510. At a time after the UE 502 loses the UL synchronization 510, DL data arrives 512 at the gNB 504. In response to the DL data arriving 512 at the gNB 504, the gNB 504 transmits 514 a PDCCH order to the UE 502. In this embodiment, the PDCCH order transmitted 514 to the UE 502 may be transmitted with one or more DL TBs based on the DL data that arrived 512 at the gNB 504. After receiving the PDCCH order, the UE 502 initiates a PRACH procedure by transmitting 516 a PRACH message 1 (e.g., PRACH preamble) to the gNB 504. In response to receiving the PRACH message 1, the gNB 504 transmits 518 a random access response (e.g., message 2) to the UE 502. At a time 520 after the gNB 504 transmits 518 the random access response, the UE 502 has UL synchronization. Accordingly, the UE 502 transmits a PUSCH 522 to the gNB 504. The PUSCH 522, in this embodiment, may be transmitted with feedback (e.g., HARQ-ACK, ACK/NACK) to the gNB 504 to indicate whether the one or more DL TBs were received correctly. By using this set of communications 500, DL data (e.g., one or more DL TBs) may be transmitted to the UE 502 faster than in other embodiments, such as the embodiment described in FIG. 4.

In certain embodiment, the gNB 504 sends a DL TB (or more than one TBs in case of MIMO) along with the PDCCH order and the UE 502 sends the HARQ feedback as part of the PUSCH 522 transmission after getting UL time aligned based on a TA command received in message 2. In some embodiments, the DL TB may be transmitted together (e.g., in the same slot) with the PDCCH order.

In various embodiments, DCI carrying the PDCCH order may also carry scheduling information for the PDSCH carrying DL TB. In certain embodiments, a new DCI format may be used to signal presence of both a PDCCH order as well as downlink assignment. This new DCI format may have contents of both PDCCH order as well as of downlink assignment (e.g., those present in format 1_0). Some of the contents from format 1_0 may be omitted to reduce the size of the new DCI format or to make it the same and/or similar size to format 1_0. The content of this new DCI format may resemble the content described herein. In one embodiment, the UE 502 monitors for this new DCI format only if an uplink timing alignment timer expires.

In some embodiments, the contents of DCI format 1_0 may be redesigned or rearranged in a way to include only the information necessary at times in which both PDCCH order and a downlink assignment are present. In such embodiment, a UE capability may indicate if the UE 502 is capable of interpreting the redesigned format 1_0. Further, if the network is capable of transmitting such a redesigned format 1_0, the network (e.g., gNB 504) may indicate this capability to the UE 502 (e.g., using RRC signaling configuration). For example, the network may indicate that the DCI format 1_0 will be used in the redesigned way. In certain embodiments, the redesigned DCI format 1_0 is used only at times in which the UE 502 has lost UL synchronization.

In various embodiments, parsing and interpretation of DCI format 1_0 that is redesigned may be done as described herein. For example, the following information may be transmitted by means of the DCI format 1_0_redesigned with CRC scrambled by C-RNTI, CS-RNTI, or a new-RNTI: 1) Identifier for DCI formats—1 bit. The value of this bit field is always set to 1, indicating a DL DCI format; 2) Legacy usage—1 bit. A value of TRUE means that the rest of the fields in this DCI will be interpreted exactly as in legacy DCI format 1_0 starting immediately with frequency domain resource assignment. A value of FALSE means that the rest of the fields in this DCI will be interpreted in a redesigned way as shown further. As may be appreciated, the use of TRUE and FALSE could be used opposite that described herein. Moreover, this field may be renamed to "new usage," "combined usage," or any suitable name; 3) Frequency domain resource assignment—$\lceil \log_2(N_{RB}^{DL,BWP}(N_{RB}^{DL,BWP}+1)/2)\rceil$ bits. $N_{RB}^{DL,BWP}$ is the size of the active DL bandwidth part in case DCI format 1_0 is monitored in the UE specific search space and satisfying: the total number of different DCI sizes monitored per slot is no more than 4 for the cell; and the total number of different DCI sizes with C-RNTI monitored per slot is no more than 3 for the cell, otherwise, $N_{RB}^{DL,BWP}$ is the size of the initial DL bandwidth part. As one other possibility number of resource block groups ("NRBG") bits are used instead of "Frequency domain resource assignment" if only resource allocation type 0 is used as defined in TS 38.212-f20; 4) Random Access Preamble index—6 bits according to ra-PreambleIndex in Subclause 5.1.2 of [8, TS38.321]; 5) UL/SUL indicator—1 bit. If the value of the "Random Access Preamble index" is not all zeros and if the UE is configured with SUL in the cell, this field indicates which UL carrier in the cell to transmit the PRACH according to Table 7.3.1.1.1-1; otherwise, this field is reserved; 6) SS/PBCH index—6 bits. If the value of the "Random Access Preamble index" is not all zeros, this field indicates the SS/PBCH that shall be used to determine the RACH occasion for the PRACH transmission; otherwise, this field is reserved; 7) PRACH Mask index—4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321]; otherwise, this field is reserved; 8) Time domain resource assignment—optionally present. Slot location for PDSCH may be fixed or RRC configured relative to a selected PRACH occasion or relative to a slot where PDCCH order DCI is transmitted. If present, network indicates a starting symbol within a slot and PDSCH duration (in terms of # of symbols) depending on the DL TB size. If not present, in one possible embodiment, the PRACH and DL assignment (i.e. PDSCH reception) take place at the same point in time (subframe, symbol#) or are apart from each other by a value (e.g. in number of symbols) either defined in specification or configured by higher layer like RRC; 9) virtual resource block ("VRB")-to-PRB mapping—1 bit according to Table 7.3.1.1.2-33 of TS 38.212-f20; 10) Modulation and coding scheme—5 bits as defined in Subclause 5.1.3 of [6, TS 38.214]; 11) New data indicator—not present; 12) Redundancy version—not present; 13) HARQ process number—not present. Instead, in one embodiment, a fixed HARQ process ID is used which is known to both the network and the UE by way of specification or configured by higher layer like RRC. If this reserved/fixed HARQ process ID was being used already (when TAT is running at the time of receiving a PDCCH order), i.e., a non-empty HARQ buffer, then the HARQ buffer shall be overwritten with the contents of the DL TB; 14) Downlink assignment index; 15) TPC command for scheduled PUCCH—not present; 16) PUCCH resource indicator—3 bits as defined in Subclause 9.2.3 of [5, TS 38.213]—in one embodiment this is present, in another embodiment this is not present; 17) PDSCH-to-HARQ feedback timing indicator—optional. If not present, PUCCH feedback after the DL-SCH could be based on a fixed time location (e.g., offset). Otherwise, this may be signaled explicitly in DCI format 1_0 for DL assignment.

In some embodiments, a PDCCH order DCI format 1_0 as defined in 3GPP TS 38.212420 is used in a redesigned way (e.g., the CRC of the DCI format 1_0 is scrambled by C-RNTI but the "Frequency domain resource assignment" field has valid resource signaling, i.e., are not all ones). In such embodiments, the 10 reserved bits of the PDCCH order may be used such that one of the 10 reserved bits indicates whether the new or old format 1_0 applies (e.g., if the 10 reserved bits are reserved or to be interpreted as described in this embodiment), and 4-6 bits may be used for VRB to PRB mapping and MCS.

In certain embodiments, a new RNTI may be used to detect and distinguish a redesigned DCI format 1_0 from DCI format 1_0. In such embodiments, the "Legacy usage" bit described above may not be used.

In various embodiments, DCI carrying a PDCCH order may also carry the scheduling information for PDSCH carrying one or several DL TBs. In such embodiments, a content of a DCI format for this DCI may be based on existing DCI format 1_1, which supports scheduling more than 1 DL TB.

A new DCI format based on DCI format 1_1 may have contents of both PDCCH order as well as downlink assignment. Some of the contents from format 1_1 may be omitted to reduce the size of the new DCI format or to make it the same size as and/or similar size to format 1_1. The content of this new DCI format may resemble the content as described herein.

In some embodiments, the contents of DCI format 1_1 may be redesigned or rearranged to include only information necessary at times in which both PDCCH order and downlink assignment are present. In certain embodiments, a UE capability may indicate if the UE 502 is capable of interpreting the redesigned format 1_1. Furthermore, if the network is capable of transmitting a redesigned format 1_1, the network may indicate this capability to the UE 502 (e.g., using RRC signaling configuration). For example, the network may indicate that the DCI format 1_1 will be used in a redesigned way.

In some embodiments, parsing and interpretation of a redesigned DCI format 1_1 may be done as described herein. In various embodiments, the following information may be transmitted using the redesigned DCI format 1_1 with CRC scrambled by C-RNTI, CS-RNTI, or a new-RNTI: 1) Identifier for DCI formats—1 bit. The value of this bit field is always set to 1, indicating a DL DCI format; 2) Legacy usage—1 bit. A value of TRUE means that the rest of the fields in this DCI will be interpreted exactly as in legacy DCI format 1_1 but starting immediately after the "Identifier for DCI formats." A value of FALSE means that the rest of the fields in this DCI will be interpreted in a redesigned was as shown further: As may be appreciated, the use of TRUE and FALSE could be used opposite that described herein. Moreover, this field may be renamed to "new usage," "combined usage," or any suitable name; 3) Frequency domain resource assignment—$\lceil \log_2(N_{RB}^{DL,BWP}(N_{RB}^{DL,BWP}+1)/2) \rceil$ bits. $N_{RB}^{DL,BWP}$ is the size of the active DL bandwidth part in case DCI format 1_1 is monitored in the UE specific search space and satisfying: the total number of different DCI sizes monitored per slot is no more than 4 for the cell, and the total number of different DCI sizes with C-RNTI monitored per slot is no more than 3 for the cell, otherwise, $N_{RB}^{DL,BWP}$ is the size of the initial DL bandwidth part; 4) Random Access Preamble index—6 bits according to ra-PreambleIndex in Subclause 5.1.2 of [8, TS38.321]; 5) UL/SUL indicator—1 bit. If the value of the "Random Access Preamble index" is not all zeros and, if the UE is configured with SUL in the cell, this field indicates which UL carrier in the cell to transmit the PRACH according to Table 7.3.1.1.1-1; otherwise, this field is reserved; 6) SS/PBCH index—6 bits. If the value of the "Random Access Preamble index" is not all zeros, this field indicates the SS/PBCH that shall be used to determine the RACH occasion for the PRACH transmission; otherwise, this field is reserved; 7) PRACH Mask index—4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321]; otherwise, this field is reserved; 8) Time domain resource assignment—optionally present. A slot location for PDSCH may be fixed or RRC configured relative to a selected PRACH occasion or relative to a slot where PDCCH order DCI is transmitted. If present, the network may indicate a starting symbol within a slot and PDSCH duration (in terms of # of symbols) depending on the DL TB size. If not present, in one possible embodiment, the PRACH and DL assignment (i.e. PDSCH reception) take place at the same point in time (subframe, symbol#) or are apart from each other by a value (e.g. in number of symbols) either defined in specification or configured by higher layer like RRC; 9) VRB-to-PRB mapping—1 bit according to Table 7.3.1.1.2-33 of TS 38.212-f20; 10) Modulation and coding scheme—5 bits as defined in Subclause 5.1.3 of [6, TS 38.214]; 11) New data indicator—Not present; 12) Redundancy version—not present; 13) HARQ process number—Not present. Instead, in one embodiment, a fixed HARQ process ID is used which is known to both the network and the UE by way of specification or configured by higher layer like RRC. If this reserved/fixed HARQ process ID was being used already (when TAT is running at the time of receiving a PDCCH order) i.e., a non-empty HARQ buffer, then the HARQ buffer shall be overwritten with the contents of the DL TB; 14) Downlink assignment index—not present; 15) TPC command for scheduled PUCCH—not present; 16) PUCCH resource indicator—3 bits as defined in Subclause 9.2.3 of [5, TS 38.213]—in one embodiment, this is present, in another embodiment, this is not present; 17) PDSCH-to-HARQ feedback timing indicator—if not present PUCCH feedback after the DL-SCH could be based on fixed time location (e.g., offset). Otherwise, it could be signaled explicitly as in format 1_0 for DL assignment.

In certain embodiments, a PDCCH order DCI format 1_0 as defined in 3GPP TS 38.212-f20 may be used in a redesigned way (e.g., the CRC of the DCI format 1_0 may be scrambled by C-RNTI but the "Frequency domain resource assignment" field may have valid resource signaling i.e., not all ones). In such embodiments, the 10 reserved bits of the PDCCH order may be used so that one of these 10 reserved bits indicates whether the new or old format 1_0 applies (e.g., if the 10 reserved bits are reserved or to be interpreted as in this embodiment) and 4-6 bits may be used for VRB to PRB mapping and MCS.

In one embodiment, the UE 502 may only interpret each field of the DCI format 1_1 as described above if the uplink timing alignment timer expires. In some embodiments, a new RNTI may be used to detect and distinguish a redesigned DCI format 1_1 from DCI format 1_1. In such embodiments, the "Legacy usage" bit described above may not be used.

In some embodiments, there may be two DCIs, both addressed to C-RNTI, sent to a UE capable of receiving both DCIs using the same C-RNTI. In such an embodiment, one of the DCIs carries a PDCCH order and the other one carries scheduling information for a PDSCH carrying a DL TB. In certain embodiments, the two DCIs may be sent together (e.g., in the same subframe and/or symbol) or in subsequent time occasion without waiting for the UE 502 to send feedback for the first DCI.

In various embodiments, if two DCIs are sued, a first DCI carrying a PDCCH order may be addressed to a new RNTI (e.g., a PDCCH-order-RNTI or PO-RNTI) and a second DCI carrying the scheduling information for the PDSCH carrying a DL TB may be addressed to C-RNTI. In such embodiments, the UE 502 may monitor only for PO-RNTI at times in which a TAT has not expired (e.g., is still running), but may monitor for both the PO-RNTI and the C-RNTI if the TAT has expired. In such embodiments, the UE 502 monitors both these RNTIs in the same (UE specific) search space.

In some embodiments, the HARQ feedback for a DL TB (and multiple DL TBs if applicable) is transmitted together with the PUSCH transmission for which the resources were allocated in RAR 518 (e.g., message 2).

In certain embodiments, the UE 502 includes a new MAC CE indicating HARQ feedback (e.g., ACK or NACK) for the DL TB (and multiple DL TBs if applicable) to the gNB 504. In such embodiments, if there is remaining grant size (e.g., from message 2) it could be filled with data, padding, and/or a padding BSR. In some embodiments, a new MAC CE is a MAC control element identified using a reserved LCD and has the purpose of indicating HARQ feedback (e.g., ACK or NACK) for the DL TB (and multiple DL TBs if applicable) to the gNB 502.

In various embodiments, at a physical layer, physical resources carrying PUSCH may also carry HARQ feedback for DL TB (and multiple DL TBs if applicable). In some embodiments, HARQ feedback may be multiplexed in PUSCH. In certain embodiments, CSI together with HARQ feedback may also be multiplexed in the PUSCH.

Figure 6:
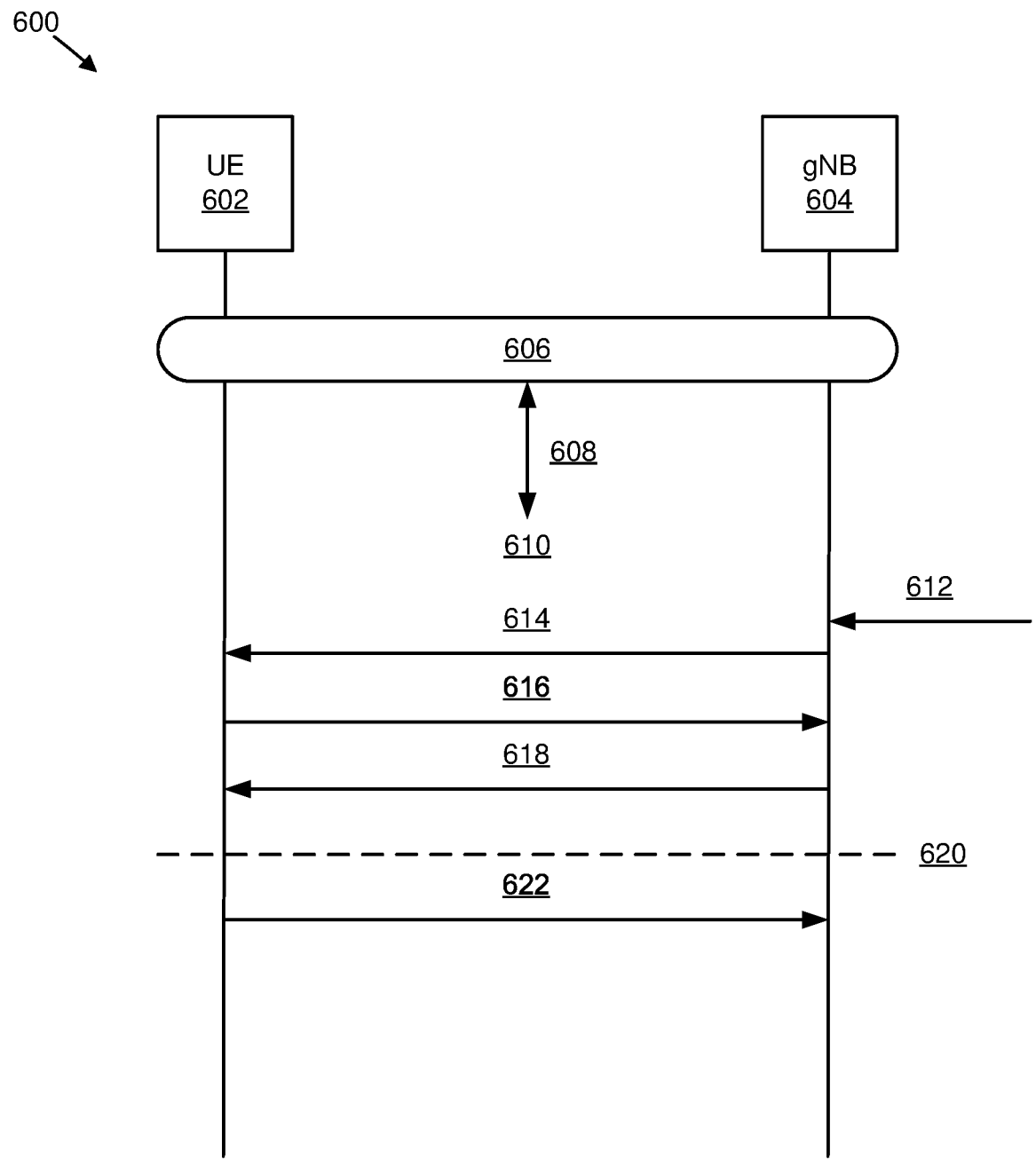
FIG. 6 is a schematic block diagram illustrating a further embodiment of communications between a UE and a gNB.

FIG. 6 is a schematic block diagram illustrating a further embodiment of communications 600 between a UE 602 (e.g., remote unit 102) and a gNB 604 (e.g., network unit 104). The communications 600 illustrate that the UE 602 starts in an RRC connected state 606. After TAT expiration 608, the UE 602 loses an UL synchronization 610. At a time after the UE 602 loses the UL synchronization 610, DL data arrives 612 at the gNB 604. In response to the DL data arriving 612 at the gNB 604, the gNB 604 transmits 614 a PDCCH order to the UE 602. In this embodiment, the PDCCH order transmitted 614 to the UE 602 may be transmitted with one or more DL TBs based on the DL data that arrived 612 at the gNB 604. After receiving the PDCCH order, the UE 602 initiates a PRACH procedure by transmitting 616 a PRACH message 1 (e.g., PRACH preamble) to the gNB 604. In this embodiment, feedback (e.g., HARQ-ACK, ACK/NACK) is transmitted with the PRACH message 1. In response to receiving the PRACH message 1, the gNB 604 transmits 618 a random access response (e.g., message 2) to the UE 602. At a time 620 after the gNB 604 transmits 618 the random access response, the UE 602 has UL synchronization. Accordingly, the UE 602 transmits a PUSCH 622 to the gNB 604. By using this set of communications 600, DL data (e.g., one or more DL TBs) may be transmitted to the UE 602 faster than in other embodiments, such as the embodiment described in FIG. 4.

In certain embodiments, the gNB 604 sends the DL TB along with the PDCCH order and the UE 602 sends the HARQ feedback as part of the PRACH transmission.

In various embodiments, the PDCCH order allocates two random access preambles. Both preambles may be reserved for the UE 602 until a certain time. Therefore, the UE 602 may perform contention free random access at times it uses one of these preambles immediately after having received the PDCCH order. In certain embodiments, the PDCCH order indicates and reserves one of the two preambles (e.g., preamble-1) for a HARQ ACK feedback. For example, the UE 602 may make the PRACH message 1 transmission using preamble-1 in response to the UE 602 successfully decoding the DL TB. Similarly, in some embodiments, the PDCCH order indicates and reserves the other of the two preambles (e.g., preamble-2) for a HARQ NACK feedback. For example, the UE 602 may make the PRACH message 1 transmission using preamble-2 in response to the UE 602 not successfully decoding the DL TB. As may be appreciated, the PRACH transmission is described in 3GPP TS 38.321 and 36.321-f20.

In some embodiments, a network signals only one preamble (e.g. for signifying ACK feedback) in a corresponding DCI format. In such embodiments, the UE 602 may derive a second preamble using a rule with respect to the signaled preamble. For example, a preamble for NACK feedback may be an immediate next preamble from the signaled preamble or is a preamble that is a certain fixed offset away from the signaled preamble.

In certain embodiments, to distinguish between a HARQ ACK and a HARQ NACK, a network may determine which PRACH time-frequency physical resources are used for the transmission. Some PRACH time-frequency physical resources may be reserved for HARQ ACK, while other PRACH time-frequency physical resources are reserved for HARQ NACK. In such embodiments, the reservation of PRACH time-frequency physical resources may be done by DCI for PDCCH order or may be done in broadcast signaling such that PRACH time-frequency physical resources with a first index (e.g., index-1) are for HARQ ACK and PRACH time-frequency physical resources with a second index (e.g., index-2) are for HARQ NACK. In some embodiments, the network may ensure that not more than 1 UE is sent the PDCCH order with a DL TB at any given time window (e.g., a time window of 5 or 10 ms).

In various embodiments, segregation between two PRACH time-frequency physical resources may done using some rules used to distinguish HARQ ACK from HARQ NACK. For example, resources are each 'x' PRB wide and the resources for NACK start after a certain offset, while the resources for ACK end. In some embodiments, ACK resources occur on even subframes and/or symbol numbers, while NACK resources occur on odd subframes and/or symbol numbers. In other embodiments, ACK resources occur on odd subframes and/or symbol numbers, while NACK resources occur on even subframes and/or symbol numbers.

Figure 7:
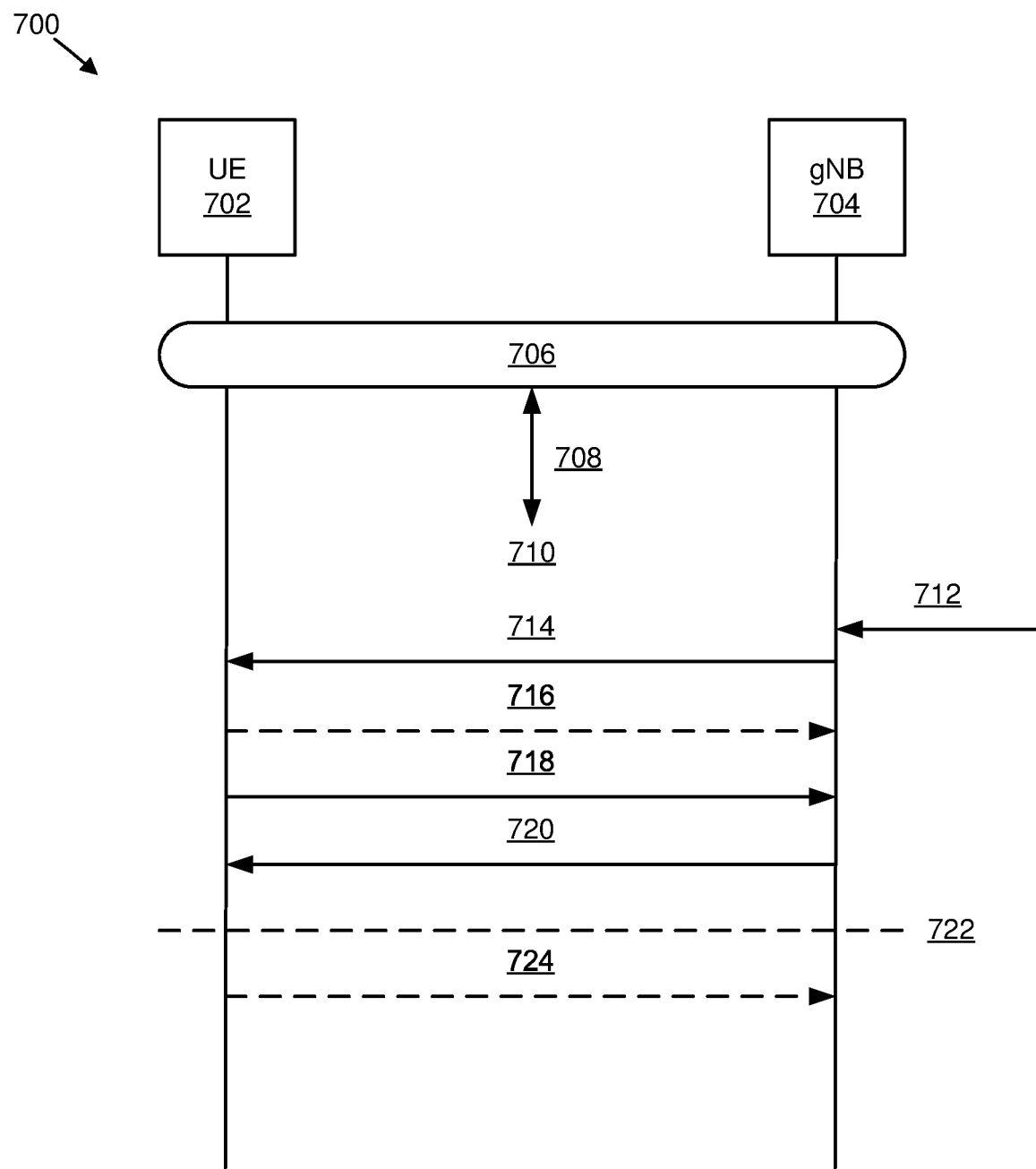
FIG. 7 is a schematic block diagram illustrating yet another embodiment of communications between a UE and a gNB.

FIG. 7 is a schematic block diagram illustrating yet another embodiment of communications 700 between a UE 702 (e.g., remote unit 102) and a gNB 704 (e.g., network unit 104). The communications 700 illustrate that the UE 702 starts in an RRC connected state 706. After TAT expiration 708, the UE 702 loses an UL synchronization 710. At a time after the UE 702 loses the UL synchronization 710, DL data arrives 712 at the gNB 704. In response to the DL data arriving 712 at the gNB 704, the gNB 704 transmits 714 a PDCCH order to the UE 702. In this embodiment, the PDCCH order transmitted 714 to the UE 702 may be transmitted with one or more DL TBs based on the DL data that arrived 712 at the gNB 704. After receiving the PDCCH order, in one embodiment, the UE 702 may transmit 716 feedback (e.g., HARQ-ACK, ACK/NACK) in PUCCH before UL synchronization. Moreover, the UE 702 initiates a PRACH procedure by transmitting 718 a PRACH message 1 (e.g., PRACH preamble) to the gNB 704. In response to receiving the PRACH message 1, the gNB 704 transmits 720 a random access response (e.g., message 2) to the UE 702. At a time 722 after the gNB 704 transmits 720 the random access response, the UE 702 has UL synchronization. Accordingly, the UE 702 transmits a PUCCH 724 to the gNB 704. In some embodiments, the feedback may be transmitted with the PUCCH, after UL synchronization. By using this set of communications 700, DL data (e.g., one or more DL TBs) may be transmitted to the UE 702 faster than in other embodiments, such as the embodiment described in FIG. 4.

In some embodiments, the gNB 704 sends one or more DL TBs along with the PDCCH order and the UE 702 sends the HARQ feedback on PUCCH. In various embodiments, a new PUCCH may be used. The new PUCCH may have a longer cyclic prefix length.

In various embodiments, one or more DL TBs may contain an RRC reconfiguration message and may also contain downlink data. In such embodiments, PUCCH resources may be configured and/or reconfigured with the RRC reconfiguration message. Moreover, the UE 702 may use the configured and/or reconfigured PUCCH resources to send HARQ feedback either: immediately (e.g., transmission 716, before getting UL Synchronized, such as if a serving cell is a small cell and a timing advance "TA" is close to a zero value and/or the UE 702 may continue to use the NTA value—the NTA value may refer to an UL timing advance value that a UE has stored most recently); or afterwards (e.g., PUCCH 724). These same transmission instances may be used for sending HARQ feedback for re-transmissions. In certain embodiments, the network may indicate that the same PUCCH configuration may be considered valid and/or active as those that were configured previously before the UE 702 went out of UL synchronization.

In some embodiments, PUCCH resources are used as defined in Chapter 9.2.1 (e.g., PUCCH resource sets) of 3GPP TS 38.213-f20: "If a UE does not have dedicated PUCCH resource configuration, provided by higher layer parameter PUCCH-ResourceSet in PUCCH-Config, a PUCCH resource set is provided by higher layer parameter pucch-ResourceCommon in SystemInformationBlockType1 through an index to a row of Table 9.2.1-1 for transmission of HARQ-ACK information on PUCCH in an initial active UL bandwidth part ("BWP") of $N_{BWP}^{size}$ PRBs provided by SystemInformationBlockType1."

In various embodiments, upon expiration of an uplink timing alignment timer, the UE 702 may release UE-specifically configured PUCCH resources of all serving cells associated with the corresponding timing advance group ("TAG"). Thus, in such embodiments, a PUCCH resource of a cell-specifically configured PUCCH resource set may be used for HARQ-ACK transmission. In other embodiments, the PUCCH resource set could be based on one fixed index in a Table 9.2.1-1: of 38.213-f20 or, an applicable index can be signaled in RRC (this may be UE specific).

In some embodiments, the UE 702 may use the PUCCH resources to send HARQ feedback immediately (e.g., before getting UL synchronized), or after getting UL synchronized, and for sending HARQ feedback for re-transmissions.

Figure 8:
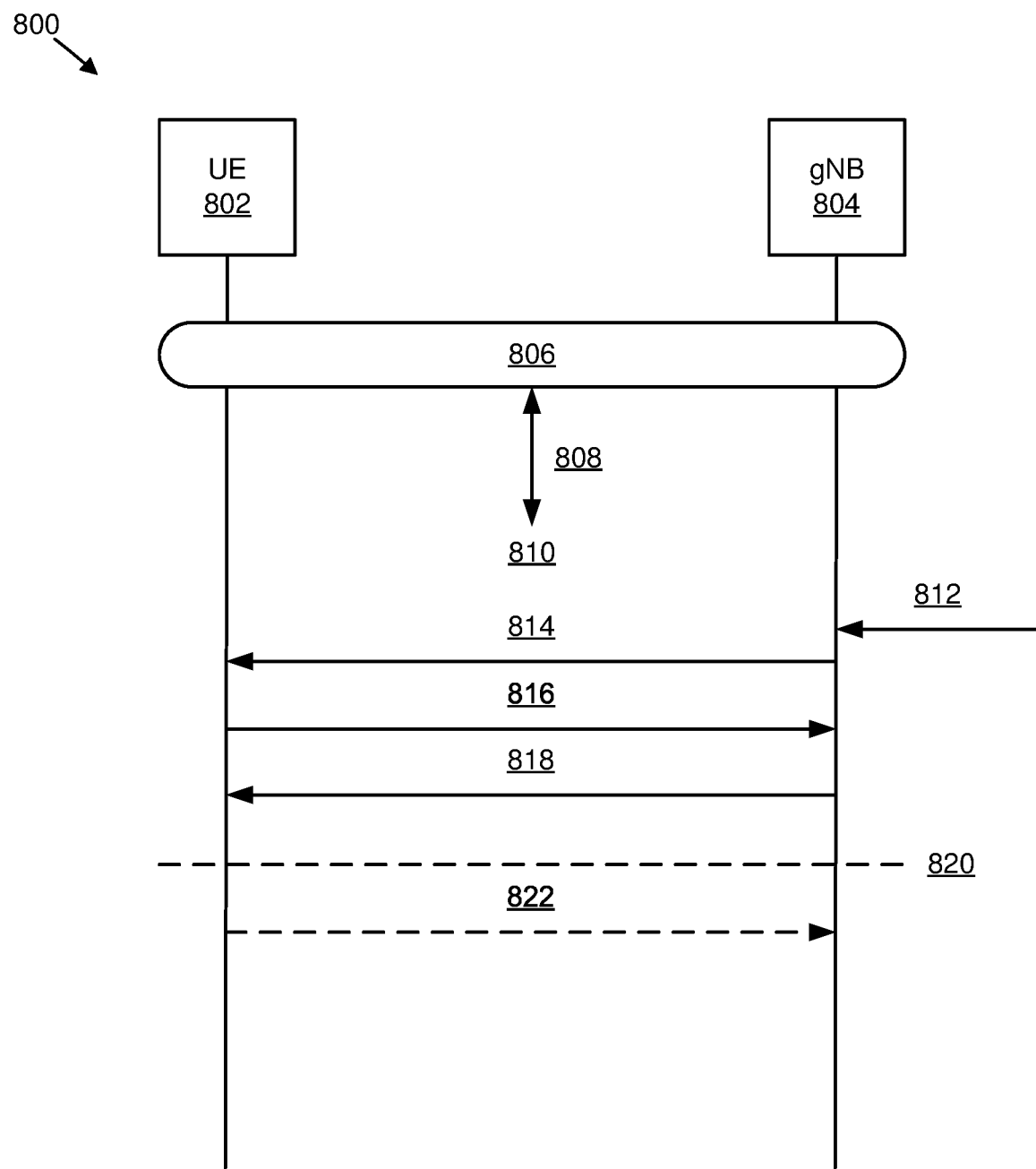
FIG. 8 is a schematic block diagram illustrating an additional embodiment of communications between a UE and a gNB.

FIG. 8 is a schematic block diagram illustrating an additional embodiment of communications 800 between a UE 802 (e.g., remote unit 102) and a gNB 804 (e.g., network unit 104). The communications 800 illustrate that the UE 802 starts in an RRC connected state 806. After TAT expiration 808, the UE 802 loses an UL synchronization 810. At a time after the UE 802 loses the UL synchronization 810, DL data arrives 812 at the gNB 804. In response to the DL data arriving 812 at the gNB 804, the gNB 804 transmits 814 a PDCCH order to the UE 802. After receiving the PDCCH order, the UE 802 initiates a PRACH procedure by transmitting 816 a PRACH message 1 (e.g., PRACH preamble) to the gNB 804. In response to receiving the PRACH message 1, the gNB 804 transmits 818 a random access response (e.g., message 2) to the UE 802. In this embodiment, the random access response may be transmitted with one or more DL TBs based on the DL data that arrived 812 at the gNB 804. At a time 820 after the gNB 804 transmits 820 the random access response, the UE 802 has UL synchronization. In this embodiment, the UE 802 may transmit 822 feedback (e.g., HARQ-ACK, ACK/NACK) to the gNB 804 after UL synchronization. By using this set of communications 800, DL data (e.g., one or more DL TBs) may be transmitted to the UE 802 faster than in other embodiments, such as the embodiment described in FIG. 4.

In certain embodiments, the gNB 804 sends one or more DL TBs together with the response (e.g., RAR, message 2) to UE's 802 message 1 transmission using a dedicated preamble. However, the UE 802 sends the feedback for the one or more DL TBs using any of the methods described herein.

Combining the one or more DL TBs together with the response to UE's 802 message 1 transmission may be done with the following options: 1) a new DCI format addressed to C-RNTI can be used with contents as follows: RAN sends a DL assignment using (modified) DCI format 1_0 that also carries the UL TA value. Some of the contents of DCI format 1_0 as described in TS 38.212-f20 like new data indicator, redundancy version, HARQ process number, downlink assignment index, TPC command for scheduled PUCCH, PUCCH resource indicator etc. may be replaced with a timing advance command and/or an UL grant described as part of "MAC payload for Random Access Response" as described in Chapter 6.2.3 of TS 36.321-f20. The UL grant may also be transmitted as part of the one or more DL TB; or 2) a new redesigned version of DCI format 1_0 as described herein may be used.

In various embodiments, the UE 802 receives a PDSCH including a timing advance value, an UL grant, and a DL assignment for one or more DL TBs as payload and being scrambled based on C-RNTI (also corresponding scheduling PDCCH's CRC being scrambled with C-RNTI), in response to a PDCCH ordered PRACH preamble transmission being received by the gNB 804. In certain embodiments, message 2 PDSCH scrambled based on C-RNTI in response to the PDCCH ordered PRACH preamble transmission may include a timing advance value, an UL grant, and/or one or more DL TBs as payload.

In certain embodiments, the UE 802 monitors PDCCH with CRC scrambled with C-RNTI for message 2 reception within a random access response window, if the PDCCH ordered PRACH preamble transmission is performed and the uplink timing alignment timer expires.

Figure 9:
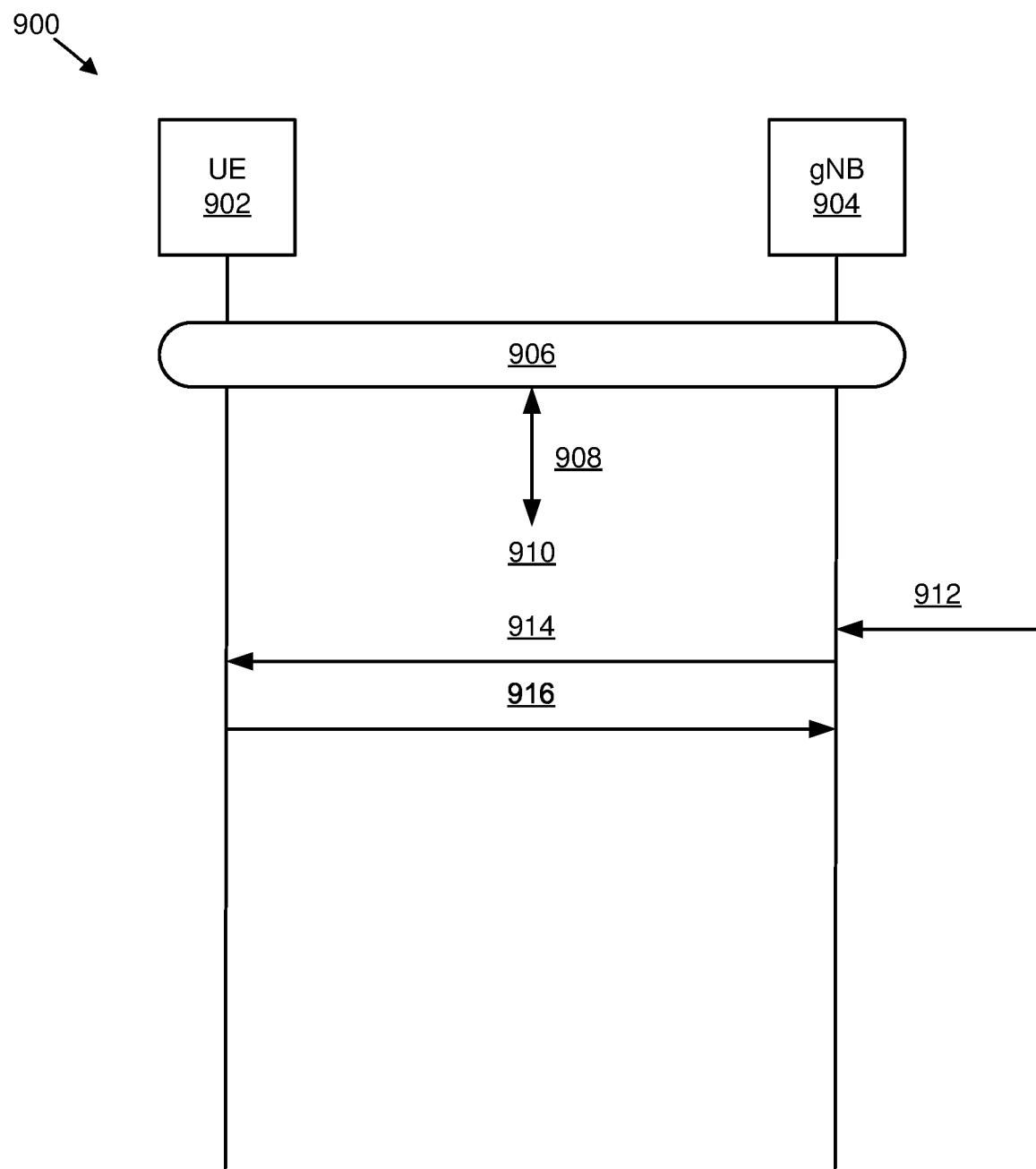
FIG. 9 is a schematic block diagram illustrating yet a further embodiment of communications between a UE and a gNB.

FIG. 9 is a schematic block diagram illustrating yet a further embodiment of communications 900 between a UE 902 (e.g., remote unit 102) and a gNB 904 (e.g., network unit 104). The communications 900 illustrate that the UE 902 starts in an RRC connected state 906. After TAT expiration 908, the UE 902 loses an UL synchronization 910. At a time after the UE 902 loses the UL synchronization 910, DL data arrives 912 at the gNB 904. In response to the DL data arriving 912 at the gNB 904, the gNB 904 transmits 914 a PDCCH order to the UE 902. After receiving the PDCCH order, in one embodiment, the UE 902 may transmit 916 CSI feedback to the gNB 904.

In some embodiments, the gNB 904 includes a CSI request field along with the PDCCH order (as described in TS 38.212-f20 Chapter 7.3.1.2.1) using some of the 10 reserved bits in the PDCCH order. In various embodiments, a CSI request is 0, 1, 2, 3, 4, 5, or 6 bits determined by a higher layer parameter reportTriggerSize. In certain embodiments, the UE 902, upon receiving the PDCCH order with the CSI request field may initiate a random access procedure, perform CSI estimation, and include the CSI estimation in a response to the gNB 904 similar to one of the feedback responses described herein.

In some embodiments, a DL TB is re-transmitted a fixed number of times which the UE 902 may receive before the UE 902 is required to transmit any feedback. Feedback transmission may be accomplished using any of the feedback responses described herein.

In certain embodiments, a DL TB may be re-transmitted a fixed number of times which the UE 902 may receive before the UE 902 is required to transmit any feedback. In various embodiments, feedback is transmitted only if the UE 902 fails to decode the DL TB successfully. Feedback transmission may be accomplished using any of the feedback responses described herein.

In some embodiments, more than one DL TB may be transmitted with and/or after a PDCCH order until the UE 902 starts to transmit a PRACH message 1 or until the UE 902 receives message 2. If more than one DL TB is transmitted, then the RAN may indicate a HARQ process identifier.

In various embodiments, a network may indicate with a given DL TB that the DL TB is the last TB to be sent at that point of time. This indication may be sent along with a PDCCH order (as described in TS 38.212-f20 Chapter 7.3.1.2.1) using one of the 10 reserved bits in the PDCCH order as a Boolean Flag (e.g., TRUE=Last DL TB). In certain embodiments, the UE 902: may not perform any UL transmission after receiving this last DL TB; may transmit the feedback for this last DL TB (feedback transmission may be accomplished using any of the feedback responses described herein); and/or may just perform PRACH transmission, apply TA upon receiving the message 2 and transmit the feedback for the last DL TB (feedback transmission may be accomplished using any of the feedback responses described herein).

Figure 10:
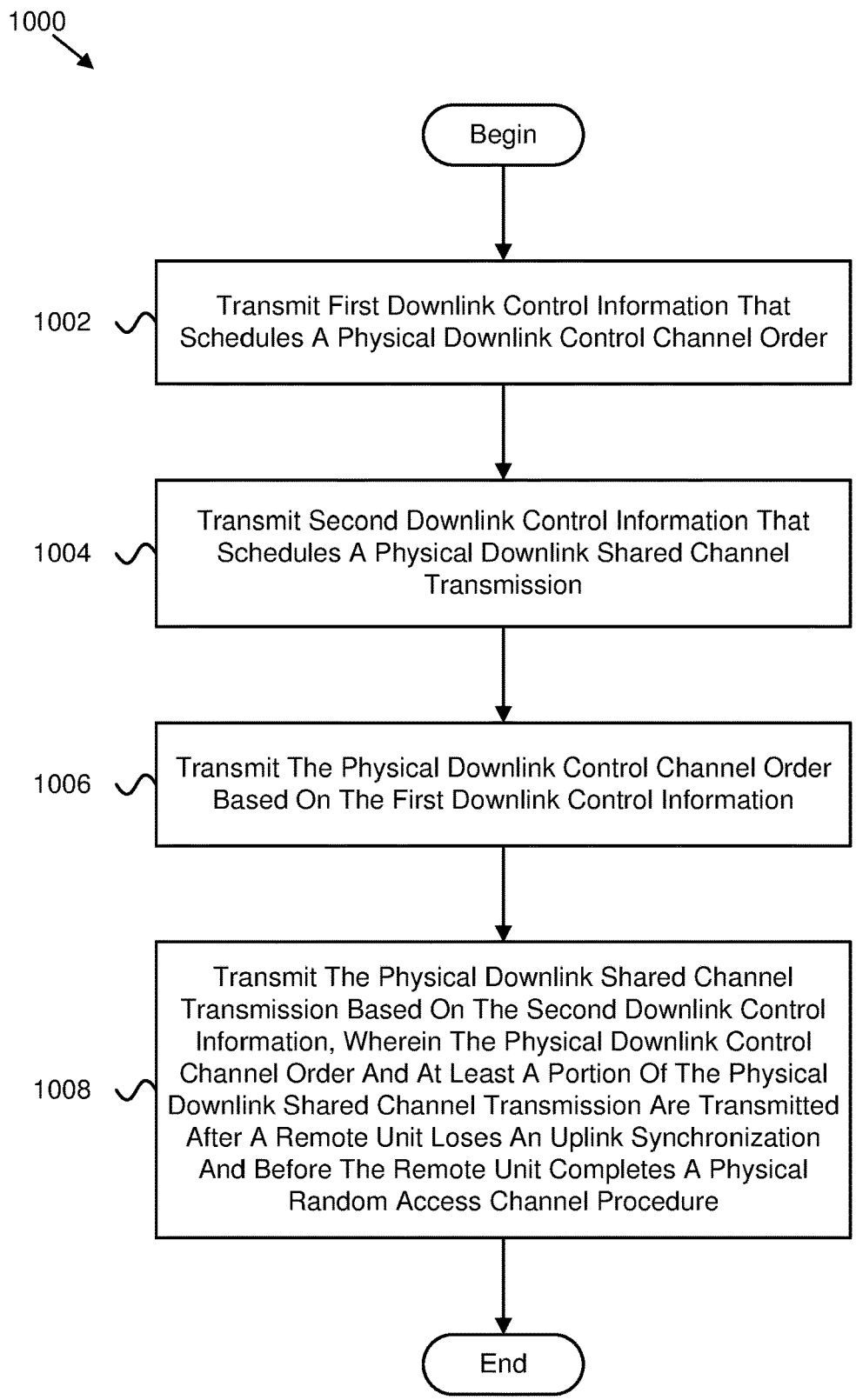
FIG. 10 is a flow chart diagram illustrating one embodiment of a method for transmitting a physical downlink shared channel after losing uplink synchronization.

FIG. 10 is a flow chart diagram illustrating one embodiment of a method 1000 for transmitting a physical downlink shared channel after losing uplink synchronization. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

The method 1000 may include transmitting 1002 first downlink control information that schedules a physical downlink control channel order. In some embodiments, the method 1000 includes transmitting 1004 second downlink control information that schedules a physical downlink shared channel transmission. In certain embodiments, the method 1000 includes transmitting 1006 the physical downlink control channel order based on the first downlink control information. In various embodiments, the method 1000 includes transmitting 1008 the physical downlink shared channel transmission based on the second downlink control information. In such embodiments, the physical downlink control channel order and at least a portion of the physical downlink shared channel transmission are transmitted after a remote unit 102 loses an uplink synchronization and before the remote unit 102 completes a physical random access channel procedure.

In various embodiments, the first downlink control information and the second downlink control information are carried within a same downlink control information format. In some embodiments, a field of the same downlink control information format indicates the physical downlink shared channel transmission. In certain embodiments, a reserved portion of the same downlink control information format indicates scheduling information for the physical downlink shared channel transmission.

In one embodiment, a reserved portion of the same downlink control information format indicates a channel state information request. In various embodiments, a radio network temporary identifier indicates whether the same downlink control information format comprises the second downlink control information. In some embodiments, the physical downlink shared channel transmission comprises only one transport block.

In certain embodiments, the physical downlink shared channel transmission comprises a plurality of transport blocks. In one embodiment, the first downlink control information and the second downlink control information are part of separate downlink control information transmissions, and the remote unit 102 is configured to detect the separate downlink control information transmissions. In various embodiments, the separate downlink control information transmissions are both addressed to a same radio network temporary identifier. In some embodiments, the separate downlink control information transmissions are addressed to different radio network temporary identifiers.

Figure 11:
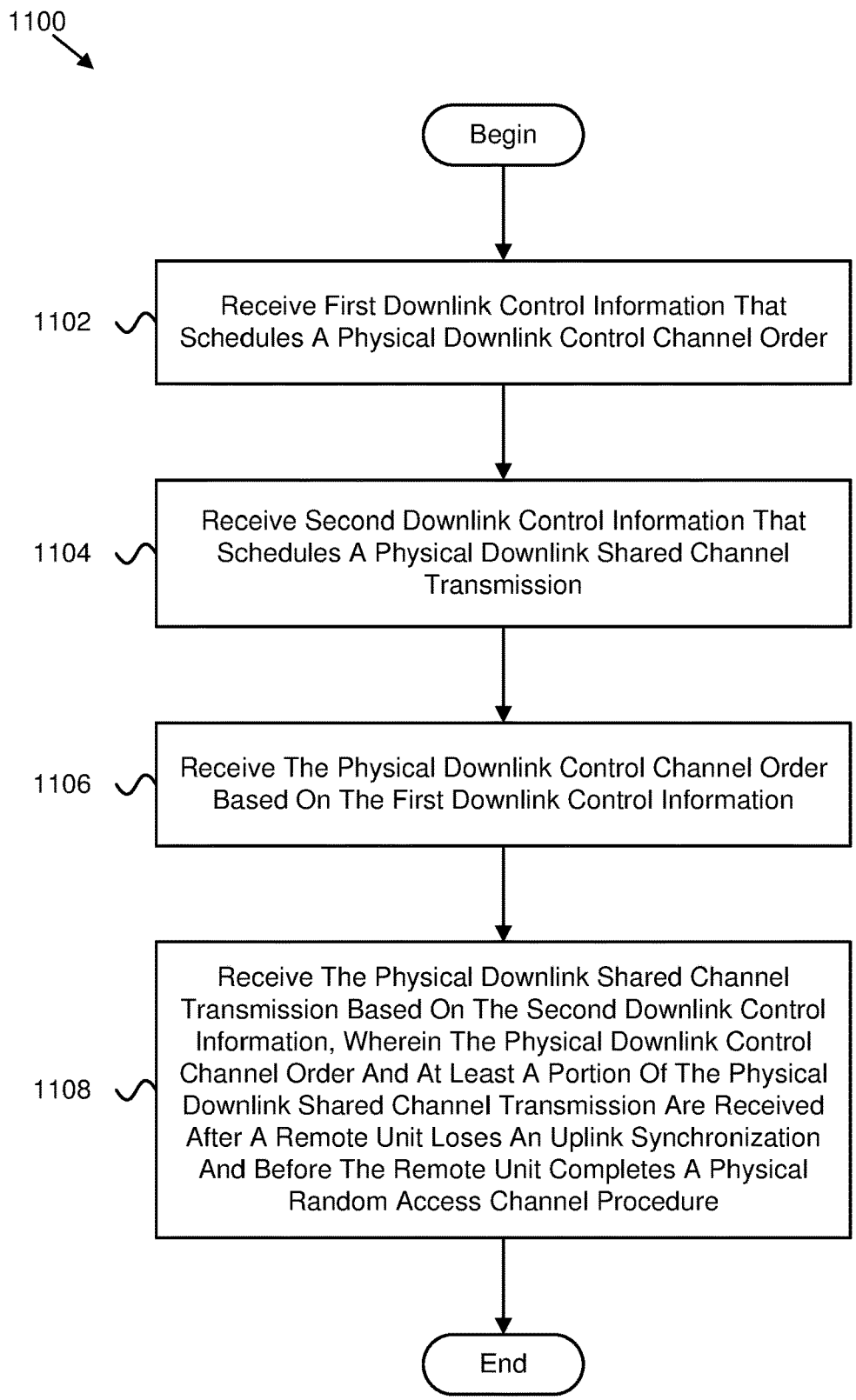
FIG. 11 is a flow chart diagram illustrating one embodiment of a method for receiving a physical downlink shared channel after losing uplink synchronization.

FIG. 11 is a flow chart diagram illustrating one embodiment of a method 1100 for receiving a physical downlink shared channel after losing uplink synchronization. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102 first downlink control information that schedules a physical downlink control channel order. In some embodiments, the method 1100 includes receiving 1104 second downlink control information that schedules a physical downlink shared channel transmission. In certain embodiments, the method 1100 includes receiving 1106 the physical downlink control channel order based on the first downlink control information. In various embodiments, the method 1100 includes receiving 1108 the physical downlink shared channel transmission based on the second downlink control information. In such embodiments, the physical downlink control channel order and at least a portion of the physical downlink shared channel transmission are received after a remote unit 102 loses an uplink synchronization and before the remote unit 102 completes a physical random access channel procedure.

In various embodiments, the first downlink control information and the second downlink control information are carried within a same downlink control information format. In some embodiments, a field of the same downlink control information format indicates the physical downlink shared channel transmission. In certain embodiments, a reserved portion of the same downlink control information format indicates scheduling information for the physical downlink shared channel transmission.

In one embodiment, a reserved portion of the same downlink control information format indicates a channel state information request. In various embodiments, a radio network temporary identifier indicates whether the same downlink control information format comprises the second downlink control information. In some embodiments, the physical downlink shared channel transmission comprises only one transport block.

In certain embodiments, the physical downlink shared channel transmission comprises a plurality of transport blocks. In one embodiment, the first downlink control information and the second downlink control information are part of separate downlink control information transmissions, and the remote unit 102 is configured to detect the separate downlink control information transmissions. In various embodiments, the separate downlink control information transmissions are both addressed to a same radio network temporary identifier. In some embodiments, the separate downlink control information transmissions are addressed to different radio network temporary identifiers.

Figure 12:
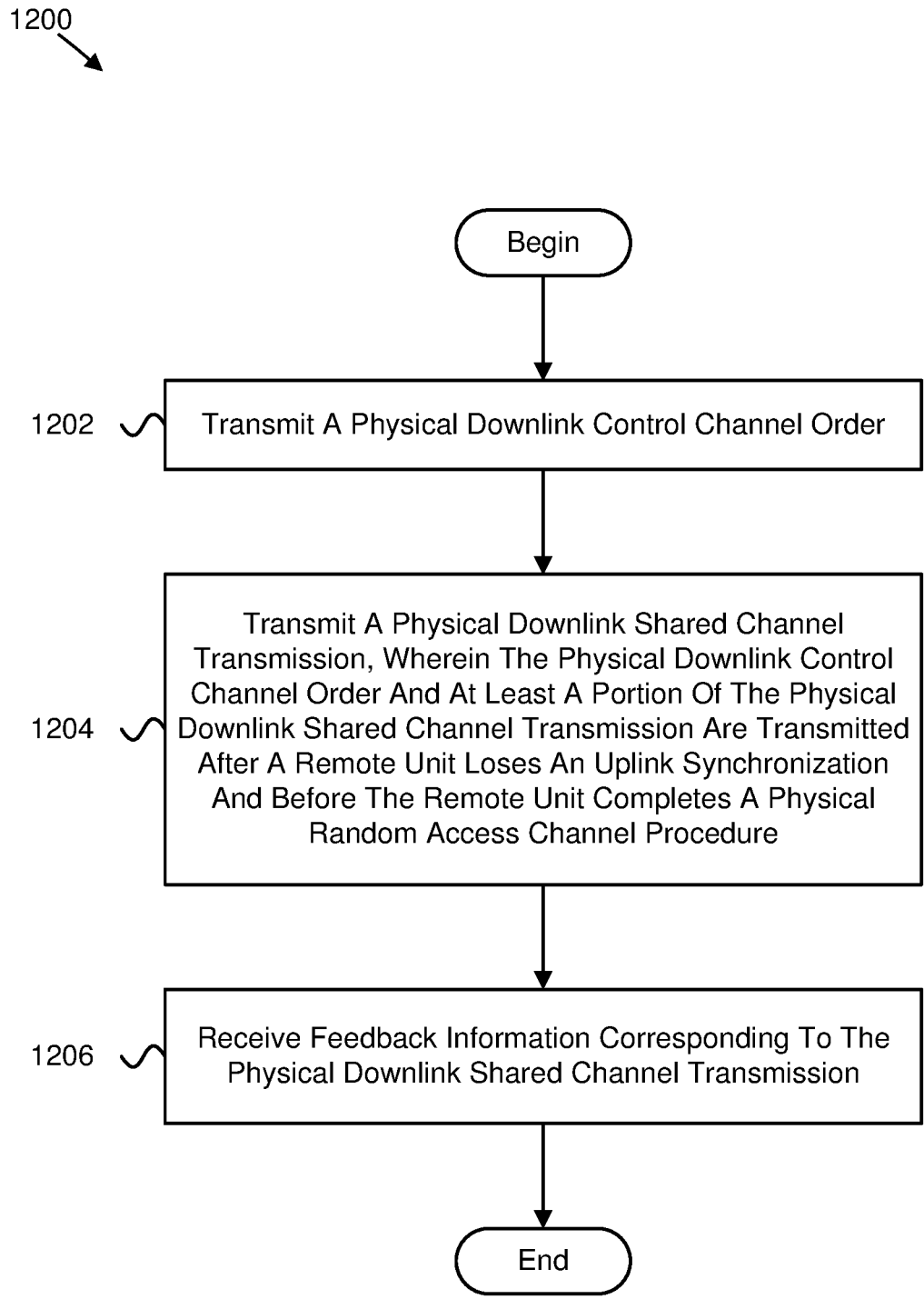
FIG. 12 is a flow chart diagram illustrating another embodiment of a method for transmitting a physical downlink shared channel after losing uplink synchronization.

FIG. 12 is a flow chart diagram illustrating another embodiment of a method 1200 for transmitting a physical downlink shared channel after losing uplink synchronization. In some embodiments, the method 1200 is performed by an apparatus, such as the network unit 104. In certain embodiments, the method 1200 may be performed by a processor executing program code, for example, a microcontroller, a microprocessor, a CPU, a GPU, an auxiliary processing unit, a FPGA, or the like.

The method 1200 may include transmitting 1202 a physical downlink control channel order. In some embodiments, the method 1200 includes transmitting 1204 a physical downlink shared channel transmission. In such embodiments, the physical downlink control channel order and at least a portion of the physical downlink shared channel transmission are transmitted after a remote unit 102 loses an uplink synchronization and before the remote unit 102 completes a physical random access channel procedure. In certain embodiments, the method 1200 includes receiving 1206 feedback information corresponding to the physical downlink shared channel transmission.

In various embodiments, the feedback information is received using resources allocated by a random access response. In some embodiments, the feedback information is received using a medium access control control element. In certain embodiments, the feedback information is multiplexed with a physical uplink shared channel transmission.

In one embodiment, the feedback information is received as part of a physical random access channel transmission. In various embodiments, the feedback information is received by a first random access channel preamble indicating an acknowledgement and a second random access channel preamble indicating a non-acknowledgement. In some embodiments, the method 1200 comprises transmitting information indicating the first random access channel preamble and the second random access channel preamble.

In certain embodiments, the method 1200 comprises transmitting information indicating either the first random access channel preamble or the second random access channel preamble, wherein the remote unit 102 comprises a mapping linking the first random access channel preamble to the second random access channel preamble. In one embodiment, the feedback information is received by a first set of resources indicating an acknowledgement and a second set of resources indicating a non-acknowledgement. In various embodiments, predetermined rules are used to identify the first set of resources and the second set of resources.

In some embodiments, the feedback information is received using resources allocated by a radio resource control message. In certain embodiments, the feedback information is received using physical uplink control channel resources. In one embodiment, transmitting the physical downlink shared channel transmission comprises transmitting the physical downlink shared channel transmission a predetermined number of times.

In various embodiments, receiving the feedback information comprises receiving the feedback information after the physical downlink shared channel transmission is transmitted the predetermined number of times. In some embodiments, receiving the feedback information comprises receiving the feedback information only in response to the remote unit 102 failing to decode the physical downlink shared channel transmission. In certain embodiments, transmitting the physical downlink shared channel transmission comprises transmitting a plurality of transport blocks, and receiving the feedback information comprises receiving a hybrid automatic repeat request identity for each transport block of the plurality of transport blocks. In one embodiment, transmitting the plurality of transport blocks comprises transmitting an indication with a last transport block of the plurality of transport blocks, and the indication indicates that no transport blocks are to be transmitted after the last transport block.

Figure 13:
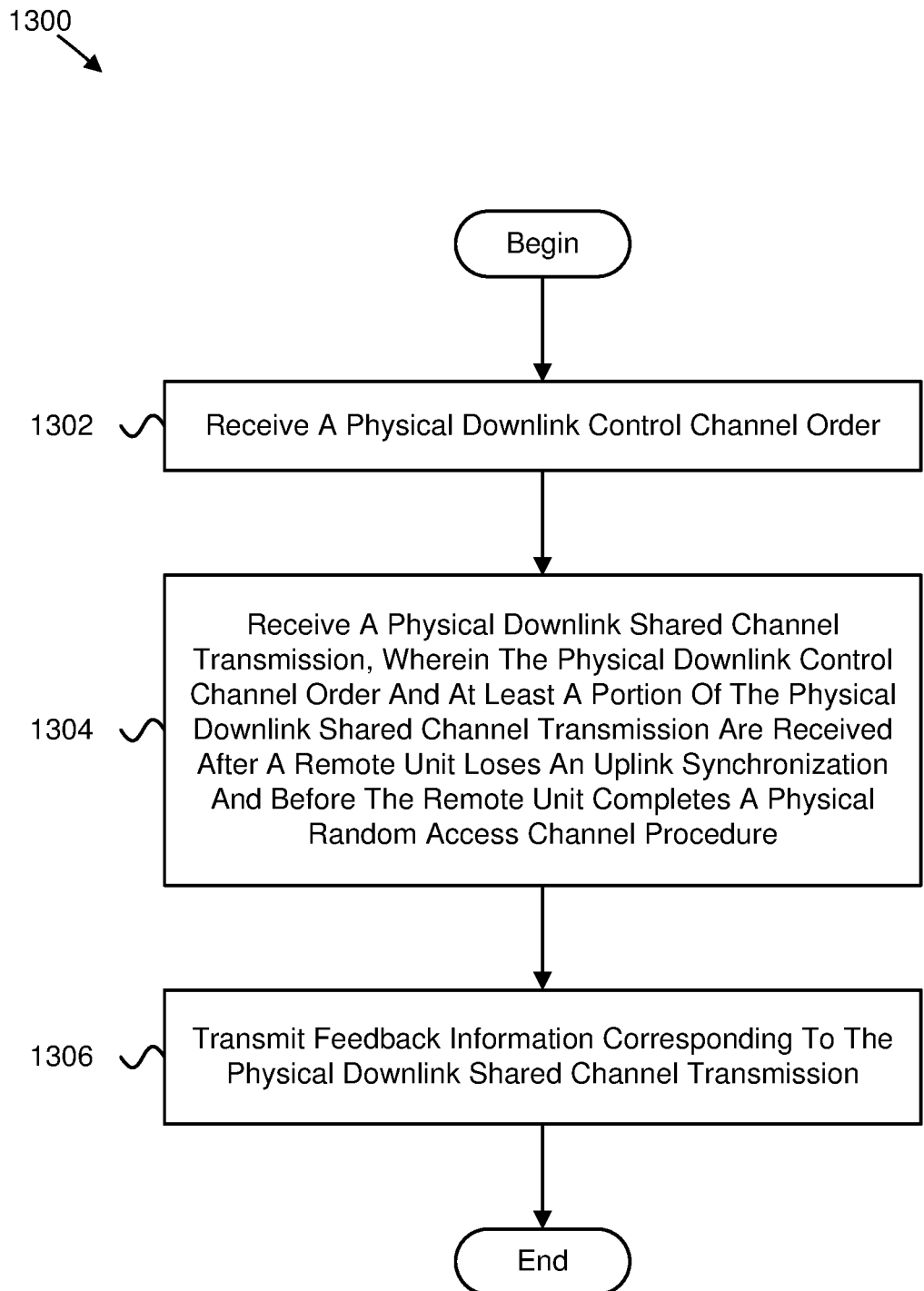
FIG. 13 is a flow chart diagram illustrating another embodiment of a method for receiving a physical downlink shared channel after losing uplink synchronization.

FIG. 13 is a flow chart diagram illustrating another embodiment of a method 1300 for receiving a physical downlink shared channel after losing uplink synchronization. In some embodiments, the method 1300 is performed by an apparatus, such as the remote unit 102. In certain embodiments, the method 1300 may be performed by a processor executing program code, for example, a microcontroller, a microprocessor, a CPU, a GPU, an auxiliary processing unit, a FPGA, or the like.

The method 1300 may include receiving 1302 a physical downlink control channel order. In some embodiments, the method 1300 includes receiving 1304 a physical downlink shared channel transmission. In such embodiments, the physical downlink control channel order and at least a portion of the physical downlink shared channel transmission are received after a remote unit 102 loses an uplink synchronization and before the remote unit 102 completes a physical random access channel procedure. In certain embodiments, the method 1300 includes transmitting 1306 feedback information corresponding to the physical downlink shared channel transmission.

In various embodiments, the feedback information is transmitted using resources allocated by a random access response. In some embodiments, the feedback information is transmitted using a medium access control control element. In certain embodiments, the feedback information is multiplexed with a physical uplink shared channel transmission.

In one embodiment, the feedback information is transmitted as part of a physical random access channel transmission. In various embodiments, the feedback information is transmitted by a first random access channel preamble indicating an acknowledgement and a second random access channel preamble indicating a non-acknowledgement. In some embodiments, the method 1300 comprises receiving information indicating the first random access channel preamble and the second random access channel preamble.

In certain embodiments, the method 1300 comprises receiving information indicating either the first random access channel preamble or the second random access channel preamble, wherein the remote unit 102 comprises a mapping linking the first random access channel preamble to the second random access channel preamble. In one embodiment, the feedback information is transmitted by a first set of resources indicating an acknowledgement and a second set of resources indicating a non-acknowledgement. In various embodiments, predetermined rules are used to identify the first set of resources and the second set of resources.

In some embodiments, the feedback information is transmitted using resources allocated by a radio resource control message. In certain embodiments, the feedback information is transmitted using physical uplink control channel resources. In one embodiment, receiving the physical downlink shared channel transmission comprises receiving the physical downlink shared channel transmission a predetermined number of times. In various embodiments, transmitting the feedback information comprises transmitting the feedback information after the physical downlink shared channel transmission is received the predetermined number of times.

In some embodiments, transmitting the feedback information comprises transmitting the feedback information only in response to the remote unit 102 failing to decode the physical downlink shared channel transmission. In certain embodiments, receiving the physical downlink shared channel transmission comprises receiving a plurality of transport blocks, and transmitting the feedback information comprises transmitting a hybrid automatic repeat request identity for each transport block of the plurality of transport blocks. In one embodiment, receiving the plurality of transport blocks comprises receiving an indication with a last transport block of the plurality of transport blocks, and the indication indicates that no transport blocks are to be received after the last transport block.

Figure 14:
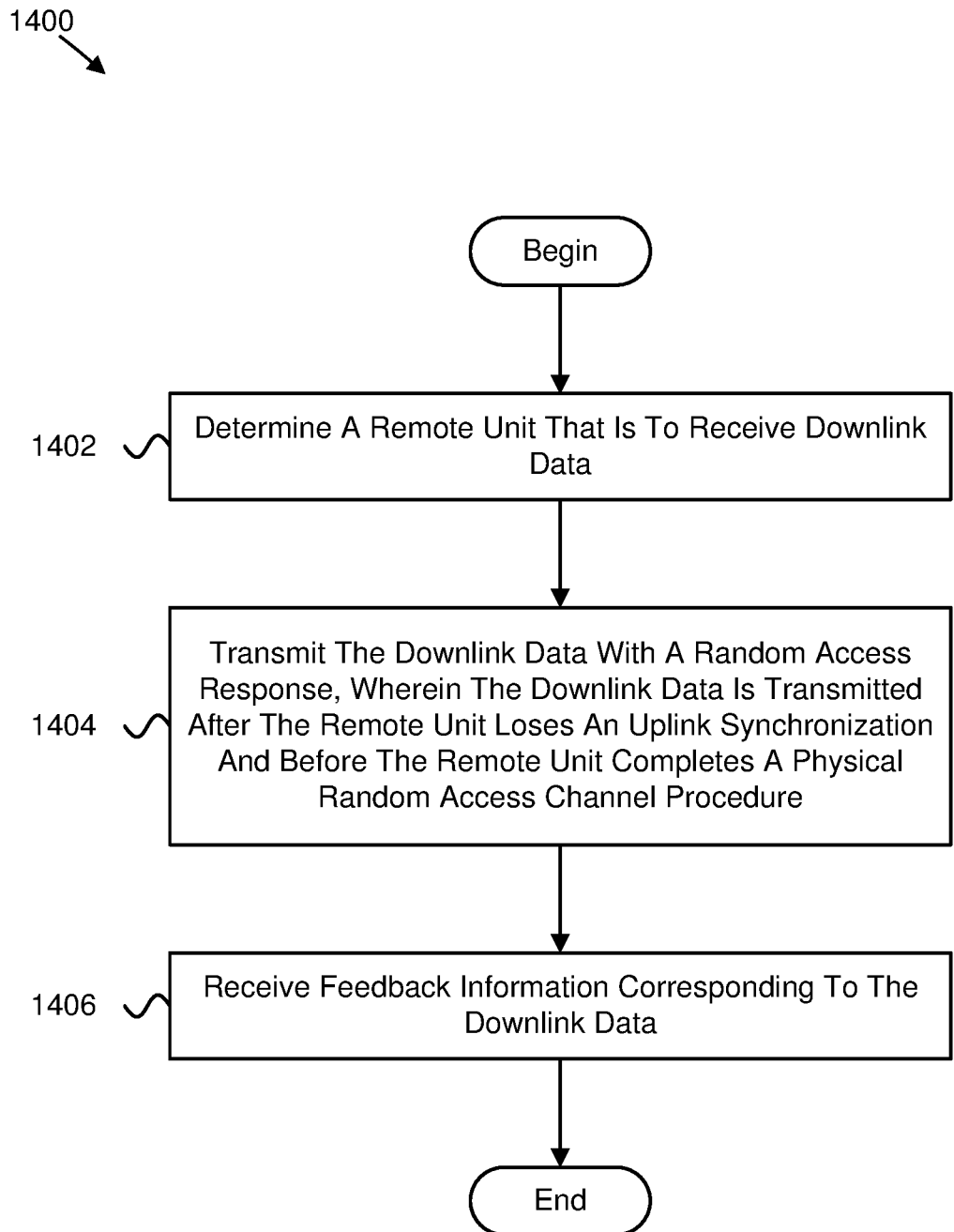
FIG. 14 is a flow chart diagram illustrating one embodiment of a method for transmitting downlink data.

FIG. 14 is a flow chart diagram illustrating one embodiment of a method 1400 for transmitting downlink data. In some embodiments, the method 1400 is performed by an apparatus, such as the network unit 104. In certain embodiments, the method 1400 may be performed by a processor executing program code, for example, a microcontroller, a microprocessor, a CPU, a GPU, an auxiliary processing unit, a FPGA, or the like.

The method 1400 may include determining 1402 a remote unit 102 that is to receive downlink data. In some embodiments, the method 1400 includes transmitting 1404 the downlink data with a random access response. In such embodiments, the downlink data is transmitted after the remote unit 102 loses an uplink synchronization and before the remote unit 102 completes a physical random access channel procedure. In certain embodiments, the method 1400 includes receiving 1406 feedback information corresponding to the downlink data.

In various embodiments, the method 1400 comprises receiving a physical random access channel preamble from the remote unit 102, wherein determining the remote unit 102 that is to receive downlink data comprises determining the remote unit 102 based on the physical random access channel preamble received from the remote unit 102. In some embodiments, the method 1400 comprises transmitting information indicating the physical random access channel preamble to the remote unit 102. In certain embodiments, the method 1400 comprises receiving a physical random access channel preamble from the remote unit 102, wherein determining the remote unit 102 that is to receive downlink data comprises determining the remote unit 102 based on resources carrying the physical random access channel preamble.

In one embodiment, the method 1400 comprises transmitting information indicating the resources to the remote unit 102. In various embodiments, the method 1400 comprises receiving information identifying the remote unit 102, wherein determining the remote unit 102 that is to receive downlink data comprises determining the remote unit 102 based on the information identifying the remote unit 102. In some embodiments, the information identifying the remote unit 102 is transmitted with a physical random access channel preamble.

In certain embodiments, determining the remote unit 102 that is to receive downlink data comprises determining the remote unit 102 based on resources used to receive a message from the remote unit 102. In one embodiment, the method 1400 comprises transmitting information allocating the resources to the remote unit 102. In various embodiments, the method 1400 comprises transmitting a downlink control information format to the remote unit 102.

In some embodiments, information in the downlink control information format indicates an uplink timing advance value and downlink assignment for the downlink data. In certain embodiments, the downlink control information format is addressed to the remote unit 102. In one embodiment, the method 1400 comprises transmitting a physical downlink shared channel transmission to the remote unit 102 that indicates an uplink timing advance value and downlink assignment for the downlink data. In various embodiments, the physical downlink shared channel transmission is scrambled based on a radio network temporary identifier.

Figure 15:
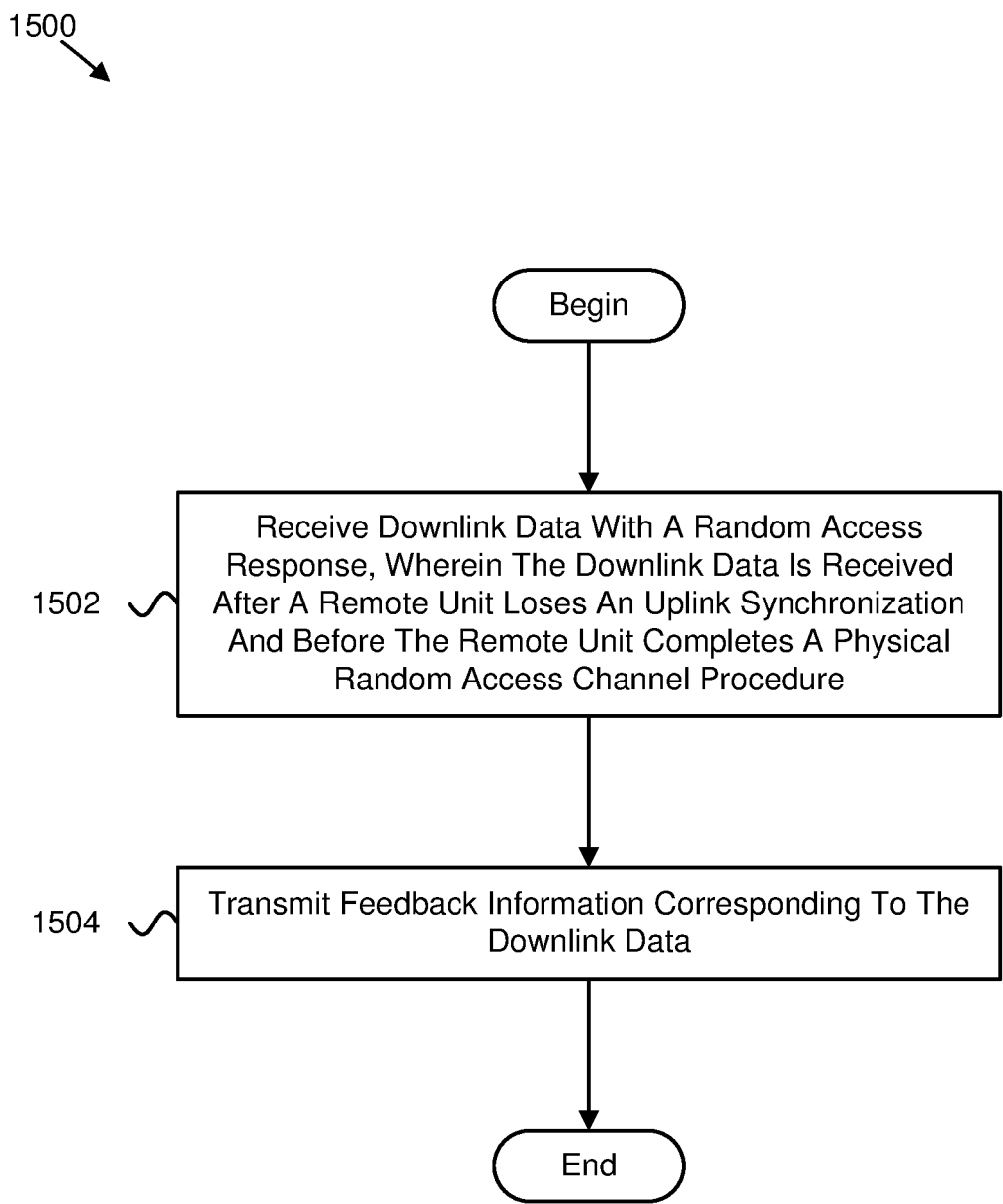
FIG. 15 is a flow chart diagram illustrating one embodiment of a method for receiving downlink data.

FIG. 15 is a flow chart diagram illustrating one embodiment of a method 1500 for receiving downlink data. In some embodiments, the method 1500 is performed by an apparatus, such as the remote unit 102. In certain embodiments, the method 1500 may be performed by a processor executing program code, for example, a microcontroller, a microprocessor, a CPU, a GPU, an auxiliary processing unit, a FPGA, or the like.

The method 1500 may include receiving 1502 downlink data with a random access response. In such embodiments, the downlink data is received after a remote unit 102 loses an uplink synchronization and before the remote unit 102 completes a physical random access channel procedure. In some embodiments, the method 1500 includes transmitting 1504 feedback information corresponding to the downlink data.

In various embodiments, the method 1500 comprises receiving information from a network unit 104 indicating a physical random access channel preamble. In some embodiments, the method 1500 comprises transmitting the physical random access channel preamble to the network unit 104. In certain embodiments, the method 1500 comprises receiving information indicating resources for carrying a physical random access channel preamble.

In one embodiment, the method 1500 comprises transmitting the physical random access channel preamble using the resources. In various embodiments, the method 1500 comprises transmitting information identifying the remote unit 102 with a physical random access channel preamble. In some embodiments, the method 1500 comprises receiving information allocating resources to the remote unit 102.

In certain embodiments, the method 1500 comprises transmitting a message to a network unit 104 using the allocated resources. In one embodiment, the method 1500 comprises receiving a downlink control information format from a network unit 104. In various embodiments, information in the downlink control information format indicates an uplink timing advance value and downlink assignment for the downlink data.

In some embodiments, the downlink control information format is addressed to the remote unit 102. In certain embodiments, the method 1500 comprises receiving a physical downlink shared channel transmission from a network unit 104 that indicates an uplink timing advance value and downlink assignment for the downlink data. In one embodiment, the physical downlink shared channel transmission is scrambled based on a radio network temporary identifier.

In one embodiment, a method comprises: transmitting first downlink control information that schedules a physical downlink control channel order; transmitting second downlink control information that schedules a physical downlink shared channel transmission; transmitting the physical downlink control channel order based on the first downlink control information; and transmitting the physical downlink shared channel transmission based on the second downlink control information, wherein the physical downlink control channel order and at least a portion of the physical downlink shared channel transmission are transmitted after a remote unit loses an uplink synchronization and before the remote unit completes a physical random access channel procedure.

In various embodiments, the first downlink control information and the second downlink control information are carried within a same downlink control information format.

In some embodiments, a field of the same downlink control information format indicates the physical downlink shared channel transmission.

In certain embodiments, a reserved portion of the same downlink control information format indicates scheduling information for the physical downlink shared channel transmission.

In one embodiment, a reserved portion of the same downlink control information format indicates a channel state information request.

In various embodiments, a radio network temporary identifier indicates whether the same downlink control information format comprises the second downlink control information.

In some embodiments, the physical downlink shared channel transmission comprises only one transport block.

In certain embodiments, the physical downlink shared channel transmission comprises a plurality of transport blocks.

In one embodiment, the first downlink control information and the second downlink control information are part of separate downlink control information transmissions, and the remote unit is configured to detect the separate downlink control information transmissions.

In various embodiments, the separate downlink control information transmissions are both addressed to a same radio network temporary identifier.

In some embodiments, the separate downlink control information transmissions are addressed to different radio network temporary identifiers.

In one embodiment, an apparatus comprises: a transmitter that: transmits first downlink control information that schedules a physical downlink control channel order; transmits second downlink control information that schedules a physical downlink shared channel transmission; transmits the physical downlink control channel order based on the first downlink control information; and transmits the physical downlink shared channel transmission based on the second downlink control information, wherein the physical downlink control channel order and at least a portion of the physical downlink shared channel transmission are transmitted after a remote unit loses an uplink synchronization and before the remote unit completes a physical random access channel procedure.

In various embodiments, the first downlink control information and the second downlink control information are carried within a same downlink control information format.

In some embodiments, a field of the same downlink control information format indicates the physical downlink shared channel transmission.

In certain embodiments, a reserved portion of the same downlink control information format indicates scheduling information for the physical downlink shared channel transmission.

In one embodiment, a reserved portion of the same downlink control information format indicates a channel state information request.

In various embodiments, a radio network temporary identifier indicates whether the same downlink control information format comprises the second downlink control information.

In some embodiments, the physical downlink shared channel transmission comprises only one transport block.

In certain embodiments, the physical downlink shared channel transmission comprises a plurality of transport blocks.

In one embodiment, the first downlink control information and the second downlink control information are part of separate downlink control information transmissions, and the remote unit is configured to detect the separate downlink control information transmissions.

In various embodiments, the separate downlink control information transmissions are both addressed to a same radio network temporary identifier.

In some embodiments, the separate downlink control information transmissions are addressed to different radio network temporary identifiers.

In one embodiment, a method comprises: receiving first downlink control information that schedules a physical downlink control channel order; receiving second downlink control information that schedules a physical downlink shared channel transmission; receiving the physical downlink control channel order based on the first downlink control information; and receiving the physical downlink shared channel transmission based on the second downlink control information, wherein the physical downlink control channel order and at least a portion of the physical downlink shared channel transmission are received after a remote unit loses an uplink synchronization and before the remote unit completes a physical random access channel procedure.

In various embodiments, the first downlink control information and the second downlink control information are carried within a same downlink control information format.

In some embodiments, a field of the same downlink control information format indicates the physical downlink shared channel transmission.

In certain embodiments, a reserved portion of the same downlink control information format indicates scheduling information for the physical downlink shared channel transmission.

In one embodiment, a reserved portion of the same downlink control information format indicates a channel state information request.

In various embodiments, a radio network temporary identifier indicates whether the same downlink control information format comprises the second downlink control information.

In some embodiments, the physical downlink shared channel transmission comprises only one transport block.

In certain embodiments, the physical downlink shared channel transmission comprises a plurality of transport blocks.

In one embodiment, the first downlink control information and the second downlink control information are part of separate downlink control information transmissions, and the remote unit is configured to detect the separate downlink control information transmissions.

In various embodiments, the separate downlink control information transmissions are both addressed to a same radio network temporary identifier.

In some embodiments, the separate downlink control information transmissions are addressed to different radio network temporary identifiers.

In one embodiment, an apparatus comprises: a receiver that: receives first downlink control information that schedules a physical downlink control channel order; receives second downlink control information that schedules a physical downlink shared channel transmission; receives the physical downlink control channel order based on the first downlink control information; and receives the physical downlink shared channel transmission based on the second downlink control information, wherein the physical downlink control channel order and at least a portion of the physical downlink shared channel transmission are received after a remote unit loses an uplink synchronization and before the remote unit completes a physical random access channel procedure.

In various embodiments, the first downlink control information and the second downlink control information are carried within a same downlink control information format.

In some embodiments, a field of the same downlink control information format indicates the physical downlink shared channel transmission.

In certain embodiments, a reserved portion of the same downlink control information format indicates scheduling information for the physical downlink shared channel transmission.

In one embodiment, a reserved portion of the same downlink control information format indicates a channel state information request.

In various embodiments, a radio network temporary identifier indicates whether the same downlink control information format comprises the second downlink control information.

In some embodiments, the physical downlink shared channel transmission comprises only one transport block.

In certain embodiments, the physical downlink shared channel transmission comprises a plurality of transport blocks.

In one embodiment, the first downlink control information and the second downlink control information are part of separate downlink control information transmissions, and the remote unit is configured to detect the separate downlink control information transmissions.

In various embodiments, the separate downlink control information transmissions are both addressed to a same radio network temporary identifier.

In some embodiments, the separate downlink control information transmissions are addressed to different radio network temporary identifiers.

In one embodiment, a method comprises: transmitting a physical downlink control channel order; transmitting a physical downlink shared channel transmission, wherein the physical downlink control channel order and at least a portion of the physical downlink shared channel transmission are transmitted after a remote unit loses an uplink synchronization and before the remote unit completes a physical random access channel procedure; and receiving feedback information corresponding to the physical downlink shared channel transmission.

In various embodiments, the feedback information is received using resources allocated by a random access response.

In some embodiments, the feedback information is received using a medium access control control element.

In certain embodiments, the feedback information is multiplexed with a physical uplink shared channel transmission.

In one embodiment, the feedback information is received as part of a physical random access channel transmission.

In various embodiments, the feedback information is received by a first random access channel preamble indicating an acknowledgement and a second random access channel preamble indicating a non-acknowledgement.

In some embodiments, the method comprises transmitting information indicating the first random access channel preamble and the second random access channel preamble.

In certain embodiments, the method comprises transmitting information indicating either the first random access channel preamble or the second random access channel preamble, wherein the remote unit comprises a mapping linking the first random access channel preamble to the second random access channel preamble.

In one embodiment, the feedback information is received by a first set of resources indicating an acknowledgement and a second set of resources indicating a non-acknowledgement.

In various embodiments, predetermined rules are used to identify the first set of resources and the second set of resources.

In some embodiments, the feedback information is received using resources allocated by a radio resource control message.

In certain embodiments, the feedback information is received using physical uplink control channel resources.

In one embodiment, transmitting the physical downlink shared channel transmission comprises transmitting the physical downlink shared channel transmission a predetermined number of times.

In various embodiments, receiving the feedback information comprises receiving the feedback information after the physical downlink shared channel transmission is transmitted the predetermined number of times.

In some embodiments, receiving the feedback information comprises receiving the feedback information only in response to the remote unit failing to decode the physical downlink shared channel transmission.

In certain embodiments, transmitting the physical downlink shared channel transmission comprises transmitting a plurality of transport blocks, and receiving the feedback information comprises receiving a hybrid automatic repeat request identity for each transport block of the plurality of transport blocks.

In one embodiment, transmitting the plurality of transport blocks comprises transmitting an indication with a last transport block of the plurality of transport blocks, and the indication indicates that no transport blocks are to be transmitted after the last transport block.

In one embodiment, an apparatus comprises: a transmitter that: transmits a physical downlink control channel order; and transmits a physical downlink shared channel transmission, wherein the physical downlink control channel order and at least a portion of the physical downlink shared channel transmission are transmitted after a remote unit loses an uplink synchronization and before the remote unit completes a physical random access channel procedure; and a receiver that receives feedback information corresponding to the physical downlink shared channel transmission.

In various embodiments, the feedback information is received using resources allocated by a random access response.

In some embodiments, the feedback information is received using a medium access control control element.

In certain embodiments, the feedback information is multiplexed with a physical uplink shared channel transmission.

In one embodiment, the feedback information is received as part of a physical random access channel transmission.

In various embodiments, the feedback information is received by a first random access channel preamble indicating an acknowledgement and a second random access channel preamble indicating a non-acknowledgement.

In some embodiments, the transmitter transmits information indicating the first random access channel preamble and the second random access channel preamble.

In certain embodiments, the transmitter transmits information indicating either the first random access channel preamble or the second random access channel preamble, and the remote unit comprises a mapping linking the first random access channel preamble to the second random access channel preamble.

In one embodiment, the feedback information is received by a first set of resources indicating an acknowledgement and a second set of resources indicating a non-acknowledgement.

In various embodiments, predetermined rules are used to identify the first set of resources and the second set of resources.

In some embodiments, the feedback information is received using resources allocated by a radio resource control message.

In certain embodiments, the feedback information is received using physical uplink control channel resources.

In one embodiment, the transmitter transmits the physical downlink shared channel transmission by transmitting the physical downlink shared channel transmission a predetermined number of times.

In various embodiments, the receiver receives the feedback information by receiving the feedback information after the physical downlink shared channel transmission is transmitted the predetermined number of times.

In some embodiments, the receiver receives the feedback information by receiving the feedback information only in response to the remote unit failing to decode the physical downlink shared channel transmission.

In certain embodiments, the transmitter transmits the physical downlink shared channel transmission by transmitting a plurality of transport blocks, and the receiver receives the feedback information by receiving a hybrid automatic repeat request identity for each transport block of the plurality of transport blocks.

In one embodiment, the transmitter transmits the plurality of transport blocks by transmitting an indication with a last transport block of the plurality of transport blocks, and the indication indicates that no transport blocks are to be transmitted after the last transport block.

In one embodiment, a method comprises: receiving a physical downlink control channel order; receiving a physical downlink shared channel transmission, wherein the physical downlink control channel order and at least a portion of the physical downlink shared channel transmission are received after a remote unit loses an uplink synchronization and before the remote unit completes a physical random access channel procedure; and transmitting feedback information corresponding to the physical downlink shared channel transmission.

In various embodiments, the feedback information is transmitted using resources allocated by a random access response.

In some embodiments, the feedback information is transmitted using a medium access control control element.

In certain embodiments, the feedback information is multiplexed with a physical uplink shared channel transmission.

In one embodiment, the feedback information is transmitted as part of a physical random access channel transmission.

In various embodiments, the feedback information is transmitted by a first random access channel preamble indicating an acknowledgement and a second random access channel preamble indicating a non-acknowledgement.

In some embodiments, the method comprises receiving information indicating the first random access channel preamble and the second random access channel preamble.

In certain embodiments, the method comprises receiving information indicating either the first random access channel preamble or the second random access channel preamble, wherein the remote unit comprises a mapping linking the first random access channel preamble to the second random access channel preamble.

In one embodiment, the feedback information is transmitted by a first set of resources indicating an acknowledgement and a second set of resources indicating a non-acknowledgement.

In various embodiments, predetermined rules are used to identify the first set of resources and the second set of resources.

In some embodiments, the feedback information is transmitted using resources allocated by a radio resource control message.

In certain embodiments, the feedback information is transmitted using physical uplink control channel resources.

In one embodiment, receiving the physical downlink shared channel transmission comprises receiving the physical downlink shared channel transmission a predetermined number of times.

In various embodiments, transmitting the feedback information comprises transmitting the feedback information after the physical downlink shared channel transmission is received the predetermined number of times.

In some embodiments, transmitting the feedback information comprises transmitting the feedback information only in response to the remote unit failing to decode the physical downlink shared channel transmission.

In certain embodiments, receiving the physical downlink shared channel transmission comprises receiving a plurality of transport blocks, and transmitting the feedback information comprises transmitting a hybrid automatic repeat request identity for each transport block of the plurality of transport blocks.

In one embodiment, receiving the plurality of transport blocks comprises receiving an indication with a last transport block of the plurality of transport blocks, and the indication indicates that no transport blocks are to be received after the last transport block.

In one embodiment, an apparatus comprises: a receiver that: receives a physical downlink control channel order; and receives a physical downlink shared channel transmission, wherein the physical downlink control channel order and at least a portion of the physical downlink shared channel transmission are received after a remote unit loses an uplink synchronization and before the remote unit completes a physical random access channel procedure; and a transmitter that transmits feedback information corresponding to the physical downlink shared channel transmission.

In various embodiments, the feedback information is transmitted using resources allocated by a random access response.

In some embodiments, the feedback information is transmitted using a medium access control control element.

In certain embodiments, the feedback information is multiplexed with a physical uplink shared channel transmission.

In one embodiment, the feedback information is transmitted as part of a physical random access channel transmission.

In various embodiments, the feedback information is transmitted by a first random access channel preamble indicating an acknowledgement and a second random access channel preamble indicating a non-acknowledgement.

In some embodiments, the receiver receives information indicating the first random access channel preamble and the second random access channel preamble.

In certain embodiments, the receiver receives information indicating either the first random access channel preamble or the second random access channel preamble, and the remote unit comprises a mapping linking the first random access channel preamble to the second random access channel preamble.

In one embodiment, the feedback information is transmitted by a first set of resources indicating an acknowledgement and a second set of resources indicating a non-acknowledgement.

In various embodiments, predetermined rules are used to identify the first set of resources and the second set of resources.

In some embodiments, the feedback information is transmitted using resources allocated by a radio resource control message.

In certain embodiments, the feedback information is transmitted using physical uplink control channel resources.

In one embodiment, the receiver receives the physical downlink shared channel transmission by receiving the physical downlink shared channel transmission a predetermined number of times.

In various embodiments, the transmitter transmits the feedback information by transmitting the feedback information after the physical downlink shared channel transmission is received the predetermined number of times.

In some embodiments, the transmitter transmits the feedback information by transmitting the feedback information only in response to the remote unit failing to decode the physical downlink shared channel transmission.

In certain embodiments, the receiver receives the physical downlink shared channel transmission by receiving a plurality of transport blocks, and the transmitter transmits the feedback information by transmitting a hybrid automatic repeat request identity for each transport block of the plurality of transport blocks.

In one embodiment, the receiver receives the plurality of transport blocks by receiving an indication with a last transport block of the plurality of transport blocks, and the indication indicates that no transport blocks are to be received after the last transport block.

In one embodiment, a method comprises: determining a remote unit that is to receive downlink data; transmitting the downlink data with a random access response, wherein the downlink data is transmitted after the remote unit loses an uplink synchronization and before the remote unit completes a physical random access channel procedure; and receiving feedback information corresponding to the downlink data.

In various embodiments, the method comprises receiving a physical random access channel preamble from the remote unit, wherein determining the remote unit that is to receive downlink data comprises determining the remote unit based on the physical random access channel preamble received from the remote unit.

In some embodiments, the method comprises transmitting information indicating the physical random access channel preamble to the remote unit.

In certain embodiments, the method comprises receiving a physical random access channel preamble from the remote unit, wherein determining the remote unit that is to receive downlink data comprises determining the remote unit based on resources carrying the physical random access channel preamble.

In one embodiment, the method comprises transmitting information indicating the resources to the remote unit.

In various embodiments, the method comprises receiving information identifying the remote unit, wherein determining the remote unit that is to receive downlink data comprises determining the remote unit based on the information identifying the remote unit.

In some embodiments, the information identifying the remote unit is transmitted with a physical random access channel preamble.

In certain embodiments, determining the remote unit that is to receive downlink data comprises determining the remote unit based on resources used to receive a message from the remote unit.

In one embodiment, the method comprises transmitting information allocating the resources to the remote unit.

In various embodiments, the method comprises transmitting a downlink control information format to the remote unit.

In some embodiments, information in the downlink control information format indicates an uplink timing advance value and downlink assignment for the downlink data.

In certain embodiments, the downlink control information format is addressed to the remote unit.

In one embodiment, the method comprises transmitting a physical downlink shared channel transmission to the remote unit that indicates an uplink timing advance value and downlink assignment for the downlink data.

In various embodiments, the physical downlink shared channel transmission is scrambled based on a radio network temporary identifier.

In one embodiment, an apparatus comprises: a processor that determines a remote unit that is to receive downlink data; a transmitter that transmits the downlink data with a random access response, wherein the downlink data is transmitted after the remote unit loses an uplink synchronization and before the remote unit completes a physical random access channel procedure; and a receiver that receives feedback information corresponding to the downlink data.

In various embodiments, the receiver receives a physical random access channel preamble from the remote unit, and the processor determines the remote unit that is to receive downlink data by determining the remote unit based on the physical random access channel preamble received from the remote unit.

In some embodiments, the transmitter transmits information indicating the physical random access channel preamble to the remote unit.

In certain embodiments, the receiver receives a physical random access channel preamble from the remote unit, and the processor determines the remote unit that is to receive downlink data by determining the remote unit based on resources carrying the physical random access channel preamble.

In one embodiment, the transmitter transmits information indicating the resources to the remote unit.

In various embodiments, the receiver receives information identifying the remote unit, and the processor determines the remote unit that is to receive downlink data by determining the remote unit based on the information identifying the remote unit.

In some embodiments, the information identifying the remote unit is transmitted with a physical random access channel preamble.

In certain embodiments, the processor determines the remote unit that is to receive downlink data by determining the remote unit based on resources used to receive a message from the remote unit.

In one embodiment, the transmitter transmits information allocating the resources to the remote unit.

In various embodiments, the transmitter transmits a downlink control information format to the remote unit.

In some embodiments, information in the downlink control information format indicates an uplink timing advance value and downlink assignment for the downlink data.

In certain embodiments, the downlink control information format is addressed to the remote unit.

In one embodiment, the transmitter transmits a physical downlink shared channel transmission to the remote unit that indicates an uplink timing advance value and downlink assignment for the downlink data.

In various embodiments, the physical downlink shared channel transmission is scrambled based on a radio network temporary identifier.

In one embodiment, a method comprises: receiving downlink data with a random access response, wherein the downlink data is received after a remote unit loses an uplink synchronization and before the remote unit completes a physical random access channel procedure; and transmitting feedback information corresponding to the downlink data.

In various embodiments, the method comprises receiving information from a network unit indicating a physical random access channel preamble.

In some embodiments, the method comprises transmitting the physical random access channel preamble to the network unit.

In certain embodiments, the method comprises receiving information indicating resources for carrying a physical random access channel preamble.

In one embodiment, the method comprises transmitting the physical random access channel preamble using the resources.

In various embodiments, the method comprises transmitting information identifying the remote unit with a physical random access channel preamble.

In some embodiments, the method comprises receiving information allocating resources to the remote unit.

In certain embodiments, the method comprises transmitting a message to a network unit using the allocated resources.

In one embodiment, the method comprises receiving a downlink control information format from a network unit.

In various embodiments, information in the downlink control information format indicates an uplink timing advance value and downlink assignment for the downlink data.

In some embodiments, the downlink control information format is addressed to the remote unit.

In certain embodiments, the method comprises receiving a physical downlink shared channel transmission from a network unit that indicates an uplink timing advance value and downlink assignment for the downlink data.

In one embodiment, the physical downlink shared channel transmission is scrambled based on a radio network temporary identifier.

In one embodiment, an apparatus comprises: a receiver that receives downlink data with a random access response, wherein the downlink data is received after a remote unit loses an uplink synchronization and before the remote unit completes a physical random access channel procedure; and a transmitter that transmits feedback information corresponding to the downlink data.

In various embodiments, the receiver receives information from a network unit indicating a physical random access channel preamble.

In some embodiments, the transmitter transmits the physical random access channel preamble to the network unit.

In certain embodiments, the receiver receives information indicating resources for carrying a physical random access channel preamble.

In one embodiment, the transmitter transmits the physical random access channel preamble using the resources.

In various embodiments, the transmitter transmits information identifying the remote unit with a physical random access channel preamble.

In some embodiments, the receiver receives information allocating resources to the remote unit.

In certain embodiments, the transmitter transmits a message to a network unit using the allocated resources.

In one embodiment, the receiver receives a downlink control information format from a network unit.

In various embodiments, information in the downlink control information format indicates an uplink timing advance value and downlink assignment for the downlink data.

In some embodiments, the downlink control information format is addressed to the remote unit.

In certain embodiments, the receiver receives a physical downlink shared channel transmission from a network unit that indicates an uplink timing advance value and downlink assignment for the downlink data.

In one embodiment, the physical downlink shared channel transmission is scrambled based on a radio network temporary identifier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
    transmitting first downlink control information that schedules a physical downlink control channel order;
    transmitting second downlink control information that schedules a physical downlink shared channel transmission;
    transmitting the physical downlink control channel order based on the first downlink control information; and
    transmitting the physical downlink shared channel transmission based on the second downlink control information, wherein:
        the physical downlink control channel order and at least a portion of the physical downlink shared channel transmission are transmitted after a remote unit loses an uplink synchronization and before the remote unit completes a physical random access channel procedure;

the physical downlink shared channel transmission comprises a radio resource control reconfiguration message; and the radio resource control reconfiguration message comprises information indicating which physical uplink control channel resources to use for transmitting feedback corresponding to the physical downlink shared channel transmission, and the information indicating which physical uplink control channel resources to use for transmitting feedback comprises information indicating:

to transmit feedback prior to uplink synchronization; or to wait to transmit feedback until after uplink synchronization.

2. The method of claim 1, wherein the first downlink control information and the second downlink control information are carried within a same downlink control information format.

3. The method of claim 2, wherein a field of the same downlink control information format indicates the physical downlink shared channel transmission.

4. The method of claim 2, wherein a reserved portion of the same downlink control information format indicates scheduling information for the physical downlink shared channel transmission.

5. The method of claim 2, wherein a reserved portion of the same downlink control information format indicates a channel state information request.

6. The method of claim 2, wherein a radio network temporary identifier indicates whether the same downlink control information format comprises the second downlink control information.

7. The method of claim 1, wherein the physical downlink shared channel transmission comprises only one transport block.

8. The method of claim 1, wherein the physical downlink shared channel transmission comprises a plurality of transport blocks.

9. The method of claim 1, wherein the first downlink control information and the second downlink control information are part of separate downlink control information transmissions, and the remote unit is configured to detect the separate downlink control information transmissions.

10. The method of claim 9, wherein the separate downlink control information transmissions are both addressed to a same radio network temporary identifier.

11. The method of claim 9, wherein the separate downlink control information transmissions are addressed to different radio network temporary identifiers.

12. An apparatus comprising:
a transmitter that:
transmits first downlink control information that schedules a physical downlink control channel order;
transmits second downlink control information that schedules a physical downlink shared channel transmission;
transmits the physical downlink control channel order based on the first downlink control information; and
transmits the physical downlink shared channel transmission based on the second downlink control information, wherein:
the physical downlink control channel order and at least a portion of the physical downlink shared channel transmission are transmitted after a remote unit loses an uplink synchronization and before the remote unit completes a physical random access channel procedure;

the physical downlink shared channel transmission comprises a radio resource control reconfiguration message; and the radio resource control reconfiguration message comprises information indicating which physical uplink control channel resources to use for transmitting feedback corresponding to the physical downlink shared channel transmission, and the information indicating which physical uplink control channel resources to use for transmitting feedback comprises information indicating:

to transmit feedback prior to uplink synchronization; or to wait to transmit feedback until after uplink synchronization.

13. A method comprising:
receiving first downlink control information that schedules a physical downlink control channel order;
receiving second downlink control information that schedules a physical downlink shared channel transmission;
receiving the physical downlink control channel order based on the first downlink control information; and
receiving the physical downlink shared channel transmission based on the second downlink control information, wherein:
the physical downlink control channel order and at least a portion of the physical downlink shared channel transmission are received after a remote unit loses an uplink synchronization and before the remote unit completes a physical random access channel procedure;

the physical downlink shared channel transmission comprises a radio resource control reconfiguration message; and the radio resource control reconfiguration message comprises information indicating which physical uplink control channel resources to use for transmitting feedback corresponding to the physical downlink shared channel transmission, and the information indicating which physical uplink control channel resources to use for transmitting feedback comprises information indicating:

to transmit feedback prior to uplink synchronization; or to wait to transmit feedback until after uplink synchronization.

14. The method of claim 13, wherein the first downlink control information and the second downlink control information are carried within a same downlink control information format.

15. The method of claim 14, wherein a field of the same downlink control information format indicates the physical downlink shared channel transmission.

16. The method of claim 14, wherein a reserved portion of the same downlink control information format indicates scheduling information for the physical downlink shared channel transmission.

17. The method of claim 14, wherein a radio network temporary identifier indicates whether the same downlink control information format comprises the second downlink control information.

18. The method of claim 13, wherein the first downlink control information and the second downlink control information are part of separate downlink control information transmissions, and the remote unit is configured to detect the separate downlink control information transmissions.

19. The method of claim 18, wherein the separate downlink control information transmissions are both addressed to a same radio network temporary identifier.

20. An apparatus comprising:
a receiver that:
   receives first downlink control information that schedules a physical downlink control channel order;
   receives second downlink control information that schedules a physical downlink shared channel transmission;
   receives the physical downlink control channel order based on the first downlink control information; and
   receives the physical downlink shared channel transmission based on the second downlink control information, wherein:
      the physical downlink control channel order and at least a portion of the physical downlink shared channel transmission are received after the apparatus loses an uplink synchronization and before the apparatus completes a physical random access channel procedure;
      the physical downlink shared channel transmission comprises a radio resource control reconfiguration message; and
      the radio resource control reconfiguration message comprises information indicating which physical uplink control channel resources to use for transmitting feedback corresponding to the physical downlink shared channel transmission, and the information indicating which physical uplink control channel resources to use for transmitting feedback comprises information indicating:
         to transmit feedback prior to uplink synchronization; or
         to wait to transmit feedback until after uplink synchronization.

* * * * *